United States Patent
Ducau et al.

(10) Patent No.: US 11,714,905 B2
(45) Date of Patent: Aug. 1, 2023

(54) ATTRIBUTE RELEVANCE TAGGING IN MALWARE RECOGNITION

(71) Applicant: Sophos Limited, Abingdon (GB)

(72) Inventors: Felipe Nicolás Ducau, Neuquen (AR); Konstantin Berlin, Potomac, MD (US)

(73) Assignee: Sophos Limited, Abingdon (GB)

( * ) Notice: Subject to any disclaimer, the term of this patent is extended or adjusted under 35 U.S.C. 154(b) by 269 days.

(21) Appl. No.: 16/870,376

(22) Filed: May 8, 2020

(65) Prior Publication Data
US 2020/0364338 A1   Nov. 19, 2020

Related U.S. Application Data

(60) Provisional application No. 62/846,227, filed on May 10, 2019.

(51) Int. Cl.
*G06F 21/56* (2013.01)
*G06N 3/08* (2023.01)
*G06N 20/00* (2019.01)

(52) U.S. Cl.
CPC ......... *G06F 21/564* (2013.01); *G06F 21/563* (2013.01); *G06N 3/08* (2013.01); *G06N 20/00* (2019.01)

(58) Field of Classification Search
CPC .............................. G06F 21/564; G06F 21/566
See application file for complete search history.

(56) References Cited

U.S. PATENT DOCUMENTS

| | | | |
|---|---|---|---|
| 8,161,548 B1 * | 4/2012 | Wan | G06F 21/566 |
| | | | 713/188 |
| 8,181,244 B2 | 5/2012 | Boney | |
| 8,201,243 B2 | 6/2012 | Boney | |
| 8,418,250 B2 | 4/2013 | Morris et al. | |
| 8,709,924 B2 | 4/2014 | Hanawa et al. | |
| 8,719,932 B2 | 5/2014 | Boney | |
| 8,726,389 B2 | 5/2014 | Morris et al. | |
| 8,763,123 B2 | 6/2014 | Morris et al. | |
| 8,856,505 B2 | 10/2014 | Schneider | |
| 9,413,721 B2 | 8/2016 | Morris et al. | |
| 9,465,940 B1 | 10/2016 | Wojnowicz et al. | |

(Continued)

FOREIGN PATENT DOCUMENTS

| | | | |
|---|---|---|---|
| JP | 2012-27710 | 2/2012 | |
| WO | WO-2019197022 A1 * | 10/2019 | ............. G06F 21/56 |

OTHER PUBLICATIONS

Pan et al, "Transfer Joint Embedding for Cross-Domain Named Entity Recognition", 27 pages, May 2013. (Year: 2013).*

(Continued)

*Primary Examiner* — Ponnoreay Pich
(74) *Attorney, Agent, or Firm* — Strategic Patents, P.C.

(57) ABSTRACT

In general, in one aspect, a method for machine learning recognition of portable executable files as malware includes providing training data comprising features of portable executable files and a descriptive information for the portable executable files, the descriptive information comprising a family or type of malware. The method may include training a model using the training data to detect malware. The method may include using the trained model to recognize malware by providing features of a portable executable file as input and providing a threat score and descriptive information as output.

20 Claims, 9 Drawing Sheets

(56) References Cited

U.S. PATENT DOCUMENTS

| | | | | |
|---|---|---|---|---|
| 9,576,127 | B2* | 2/2017 | Stolfo | G06F 21/50 |
| 9,578,045 | B2 | 2/2017 | Jaroch et al. | |
| 9,690,933 | B1* | 6/2017 | Singh | G06N 5/025 |
| 9,838,417 | B1* | 12/2017 | Khalid | H04L 63/145 |
| 10,257,224 | B2 | 4/2019 | Jaroch et al. | |
| 10,366,233 | B1* | 7/2019 | Feinman | G06F 21/562 |
| 10,521,587 | B1* | 12/2019 | Agranonik | G06N 3/044 |
| 2003/0065926 | A1* | 4/2003 | Schultz | G06F 21/562 |
| | | | | 713/188 |
| 2009/0254992 | A1 | 10/2009 | Schultz et al. | |
| 2014/0041030 | A1* | 2/2014 | Call | G06F 21/554 |
| | | | | 726/22 |
| 2014/0331324 | A1* | 11/2014 | Stolfo | G06F 21/562 |
| | | | | 726/23 |
| 2015/0213376 | A1 | 7/2015 | Ideses et al. | |
| 2018/0314982 | A1* | 11/2018 | Gopalan | G06N 20/00 |
| 2019/0007434 | A1* | 1/2019 | McLane | G06N 3/084 |
| 2019/0132334 | A1* | 5/2019 | Johns | H04L 63/145 |
| 2020/0327225 | A1* | 10/2020 | Nguyen | G06N 3/084 |
| 2020/0364338 | A1* | 11/2020 | Ducau | G06N 3/08 |
| 2020/0380123 | A1* | 12/2020 | Reimann | G06N 3/084 |

OTHER PUBLICATIONS

Wildling, Edward, "Virus Bulletin", Nov. 1990, 24 Pages.

Ka, Monnappa, "Learning Malware Analysis: Explore the Concepts Tools and Techniques to Analyze and Investigate Windows Malware", Birmingham: Packt Publishing Jun. 2018, 9 Pages.

Souppaya, Murugiah et al., "Guide to Malware Incident Prevention and Handling for Desktops and Laptops", NIST Special Publication 800-83 Revision 1; 10.6028/NIST.SP.800-83r1 Jul. 2013, 47 Pages.

Kecman, Vojislav, "Support Vector Machines—An Introduction", https://link.springer.com/chapter/10.1007/10984697_1 Jan. 1, 2005, 10 Pages.

Devi, Dhruwajita et al., "Detection of Packed Malware", https://dl.acm.org/doi/10.1145/2490428.2490431 Aug. 2012, 1 Page.

Sikorski, Michael et al., "Practical Malware Analysis: The Hands-On Guide to Dissecting Malicious Software", San Francisco: No Starch Press 2012, 12 Pages.

Wang, Tzu-Yen et al., "Detecting Unknown Malicious Executables Using Portable Executable Headers", 2009 Fifth International Joint Conference on INC, IMS and IDC 2009, 1 Page.

Buitinck, Luis et al., "API design for machine learning software: experiences from the scikit-learn project", European Conference on Machine Learning and Principles and Practices of Knowledge Discovery in Databases Sep. 1, 2013, 15 Pages.

Menahem, Eitan et al., "Improving malware detection by applying multi-inducer ensemble", https://doi.org/10.1016/j.csda.2008.10.015 Oct. 19, 2008, 12 Pages.

Ye, Yanfang et al., "SBMDS: an interpretable string based malware detection system using SVM ensemble with bagging", https://doi.org/10.1007/s11416-008-0108-y Nov. 26, 2008, 11 Pages.

Ye, Yanfang et al., "Hierarchical associative classifier (HAC) for malware detection from the large and imbalanced gray list", https://doi.org/10.1007/s10844-009-0086-7 May 6, 2009, 20 Pages.

Dai, Jianyong et al., "Efficient Virus Detection Using Dynamic Instruction Sequences", Journal of Computers, vol. 4, No. May 5, 2009, 10 Pages.

Joachims, Thorsten, "Making large scale SVM learning practical", http://dx.doi.org/10.17877/DE290R-5098 Jun. 15, 1998, 17 Pages.

Kolter, Jeremy et al., "Learning to Detect Malicious Executables in the Wild", https://dl.acm.org/doi/10.1145/1014052.1014105 Aug. 2004, 9 Pages.

Tahan, Gil et al., "Mal-ID: Automatic Malware Detection Using Common Segment Analysis and Meta-Features", Journal of Machine Learning Research 13 2012, 31 Pages.

Elovici, Yuval et al., "Hertzberg, M. Beetz, and R. Englert (Eds.): KI 2007, LNAI 4667, pp. 44-50, 2007. © Springer-Verlag Berlin Heidelberg 2007 Applying Machine Learning Techniques for Detection of Malicious Code in Network Traffic", https://doi.org/10.1007/978-3-540-74565-5_5 2007, 7 Pages.

Henchiri, Olivier et al., "A Feature Selection and Evaluation Scheme for Computer Virus Detection", Proceedings of the Sixth International Conference on Data Mining 2006, 5 Pages, copxright: 2006.

Mukkamala, Srinivas et al., "Intrusion detection using an ensemble of intelligent paradigms", https://doi.org/10.1016/j.jnca.2004.01.003 2005, 15 Pages.

Russell, Stuart J. et al., "Artificial Intelligence: A Modern Approach Second Edition", Pearson Education 2003, 5 Pages.

\* cited by examiner

| Tag name | Multi-Head ($D_{tot}$) AUC | Recall @FPR=$10^{-2}$ | F-score @FPR=$10^{-2}$ | Joint Embedding ($D_{tot}$) AUC | Recall @FPR=$10^{-2}$ | F-score @FPR=$10^{-2}$ | Joint Embedding ($D_{CT}$) AUC | Recall | F-score |
|---|---|---|---|---|---|---|---|---|---|
| adware | 0.9710 | 0.52 | 0.67 | 0.9837 | 0.66 | 0.78 | - | - | - |
| crypto-miner | 0.9815 | 0.86 | 0.88 | 0.9973 | 0.98 | 0.95 | 0.9684 | 0.63 | 0.63 |
| downloader | 0.9620 | 0.73 | 0.83 | 0.9807 | 0.79 | 0.87 | 0.9170 | 0.99 | 0.68 |
| dropper | 0.9737 | 0.73 | 0.83 | 0.9846 | 0.83 | 0.90 | - | - | - |
| file-infector | 0.9851 | 0.73 | 0.83 | 0.9923 | 0.74 | 0.83 | 0.9639 | 0.83 | 0.68 |
| flooder | 0.9966 | 0.99 | 0.69 | 0.9997 | 0.99 | 0.70 | - | - | - |
| installer | 0.9380 | 0.58 | 0.69 | 0.9510 | 0.59 | 0.70 | - | - | - |
| packed | 0.9759 | 0.72 | 0.82 | 0.9902 | 0.87 | 0.92 | 0.9781 | 0.86 | 0.82 |
| ransomware | 0.9918 | 0.96 | 0.90 | 0.9952 | 0.97 | 0.90 | 0.6311 | 0.86 | 0.80 |
| spyware | 0.9674 | 0.71 | 0.82 | 0.9820 | 0.84 | 0.91 | 0.7438 | 0.47 | 0.48 |
| worm | 0.9770 | 0.72 | 0.82 | 0.9879 | 0.74 | 0.84 | 0.8670 | 0.77 | 0.70 |
| mean | 0.9773 | 0.75 | 0.80 | 0.9859 | 0.82 | 0.84 | 0.7677 | 0.81 | 0.74 |
| weighted mean | 0.9735 | 0.71 | 0.81 | 0.9830 | 0.80 | 0.87 | | | |

FIG. 6

ATTRIBUTE RELEVANCE TAGGING IN MALWARE RECOGNITION

CROSS-REFERENCE TO RELATED APPLICATIONS

This application claims priority to U.S. Provisional Application No. 62/846,227 filed on May 10, 2019 and titled "Attribute Relevance Tagging in Machine Learning Recognition," the entire contents of which are hereby incorporated by reference.

BACKGROUND

In the field of cybersecurity, a malware and/or other malicious artifact can potentially damage or disable a computer(s), computer system(s), and/or network(s). In some instances, the malware and/or other malicious artifact can cause damage to a computer network system and may even lead to disruption of services (for example, ransomware, distributed denial-of-service (DoS)). Thus, a malware attack can affect the devices connected to the computer network system. Some other types of malware can include program code designed to illegally gather users' personal and/or financial credentials, monitor users' web browsing, display unsolicited advertisements, redirect affiliate marketing revenues and/or the like. Furthermore, recovering a computer network system affected from a malware attack can be difficult and resource-intensive.

Historically, signature techniques have been used to recognize malware. Some signature implementations have been able to provide descriptions of the malware that is recognized. More recently, machine learning techniques have demonstrated performance and recognition advantages over signature techniques, however they typically provide a classification or likelihood that an artifact is malware and not a description of the type of malware or further information about the malware.

SUMMARY

In general, in an aspect, a method for machine learning recognition of portable executable files as malware may include providing training data comprising features of portable executable files and an attribute indicator for the portable executable files, the attribute indicator comprising a family or type of malware. The method may include training a model using the training data to detect malware. The method may include using the trained model to recognize malware by providing features of a portable executable file as input and providing a threat score and an attribute indicator as output. The method may include taking a remedial action based on the output.

In general, in an aspect, a method for machine learning recognition of artifacts as malware may include providing training data comprising features of artifacts and an attribute indicator for the artifacts, the attribute indicator comprising a type of artifact, training a machine learning model using the training data to detect malware, and using the trained machine learning model to recognize malware by providing features of an artifact as input and providing both a threat score and an attribute indicator of the type of artifact as output.

In general, in an aspect, a non-transitory processor-readable medium stores code representing instructions to be executed by a processor. The code may include executable instructions that cause the processor to provide training data comprising features of artifacts and an attribute indicator for the artifacts, the attribute indicator comprising a type of artifact. The code may include executable instructions that cause the processor to train a machine learning model using the training data to detect malware. The code may include executable instructions that cause the processor to use the trained machine learning model to recognize malware by providing features of an artifact as input and providing both a threat score and an attribute indicator of the type of artifact as output.

The artifact may include one or more of a portable executable file, a script, a Hypertext Markup Language (HTML) file, a JavaScript file, or a Hypertext Preprocessor (PHP) file. The artifact may include one or more of a network stream, a memory image, or data extracted from an artifact.

In some implementations, the machine learning model is a neural network.

In some implementations, remedial action may be taken based on the output. The remedial action may include at least one of quarantining the artifact, notifying a user or administrator that the artifact is malicious, displaying an indication that the artifact is malicious, displaying an indication of the type of artifact, or removing the artifact.

In some implementations, the type of artifact may include at least one type of artifact selected from the list of: adware, crypto-miner, downloader, dropper, fileinfector, flooder, installer, packed, ransomware, spyware, and worm. The type of artifact may include two, three, or all of these artifact types.

In some implementations, features may be determined using a feature extractor.

In some implementations, an artifact type may be determined by distilling a detection name to provide labels. In some implementations, the distilling may include determining attributes of a detected artifact.

In some implementations, training data may be generated using static detections. In some implementations, training data may be generated using behavior analysis. In some implementations, training data may be generated from analysis of data from multiple sources.

In some implementations, the type of artifact may be determined by parsing detection names to extract relevant tokens. In some implementations, the type of artifact may be determined by filtering the tokens based on prevalence. In some implementations, the type of artifact may be determined by mapping tokens to tags or labels.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 6 is a table that shows performance evaluation data for a multi-head model and a joint embedding model according to embodiments.

DESCRIPTION

Figure 1:
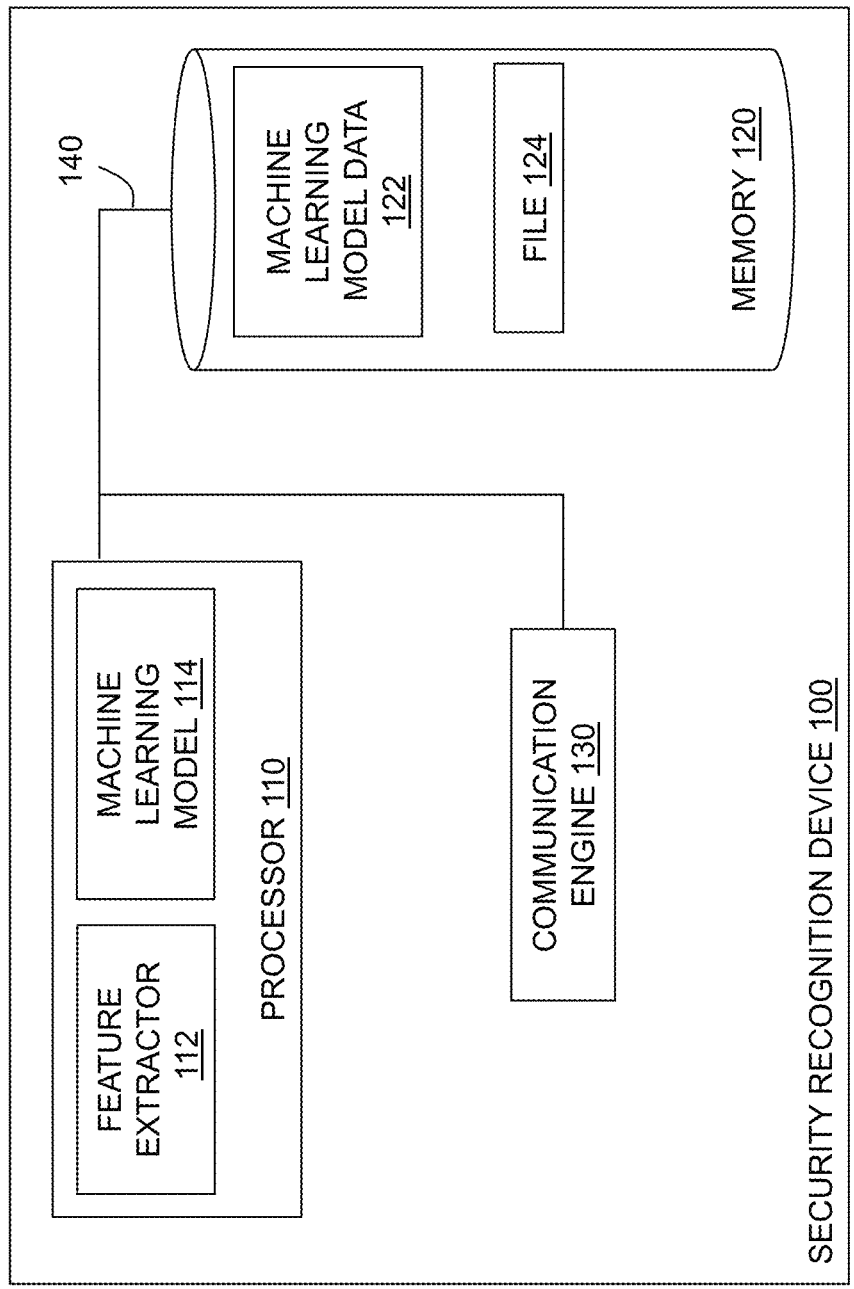
FIG. 1 illustrates a block diagram of a security recognition device according to embodiments.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

In some implementations, a machine learning model, such as a neural network or other suitable model, may be trained for a security recognition task using training data. Security recognition tasks may include but are not limited to the recognition of malware or other security threat, suspiciousness, behavior detection, or any other relevant analysis result. For example, the security recognition tasks may include detection of malware or a determination of a threat score. The object of recognition tasks may be any suitable artifact, for example, files (e.g., Portable Executable (PE) files), documents, processes, network flows, memory extracts, or any other suitable analysis object. Recognition tasks may be applied, for example, to features determined by static analysis, dynamic analysis, behavior analysis, activity analysis, or any other suitable features. In addition to features of an object of analysis, context information also may be included in training data for improved performance. In various implementations, contextual information may include an attribute indicator that may indicate a family or type of malware. The use of the attribute indicator improves the performance of machine learning recognition tasks and provides information that may be used to better understand and address the identified malware.

In an exemplary implementation, analysis objects may be PE files, and the training data includes PE file features derived from static analysis of the PE files. The training data also includes an attribute indicator for each PE file, which for malware includes one or more descriptions of a family or type of malware. The contextual information may be used in combination with the PE file features to improve the performance of the recognition task.

FIG. 1 illustrates a block diagram of a security recognition device 100, according to an embodiment. The security recognition device 100 may be, for example, a hardware-based computing device and/or a multimedia device, such as, for example, a compute device, a server, a desktop compute device, a smartphone, a tablet, a laptop, and/or the like. These are non-limiting examples, and the security recognition device 100 may be any type of compute instance. The security recognition device 100 includes a processor 110, a memory 120, and a communication engine 130.

The processor 110 may be, for example, a hardware based integrated circuit (IC) or any other suitable processing device configured to run and/or execute a set of instructions or code. For example, the processor 110 may be a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 110 is operatively coupled to the memory 120 through a system bus 140 (for example, address bus, data bus and/or control bus).

The processor 110 may include a feature extractor 112, and a machine learning model 114. Each of the feature extractor 112 and the machine learning model 114 may be implemented as software stored in memory 120 and executed by processor 110 (e.g., code to cause the processor 110 to execute the feature extractor 112 and the machine learning model 114 may be stored in the memory 120) and/or a hardware-based device such as, for example, an ASIC, an FPGA, a CPLD, a PLA, a PLC, an IC, and/or the like.

The feature extractor 112 may be configured to receive an artifact as an analysis object (e.g., one or more of a file, a memory image, a network stream, behavior information, etc.) as an input and output a feature vector associated with the analysis object. In other words, the feature extractor 112 may extract features from the analysis object and form a feature vector including indications of these features. For example, in some exemplary implementations in which the analysis object is an executable file or script, the feature extractor 112 may identify static features in a file (for example, headers, variable definitions, routines, sub-routines, strings, elements, subtrees, tags, and/or the like). A representation of these features may be used to define a feature vector. For example, in some implementations, the feature extractor 112 may normalize each feature and/or input each feature to a hash function to produce a hash value. The feature extractor 112, using the hash values, may form a feature vector (e.g., of pre-determined length and/or of variable length). For example, the hash value of each feature may identify a position and/or bucket in the feature vector and a value at that position and/or bucket in the feature vector may be incremented each time a hash value for a feature identifies that position and/or bucket. As another example, in other implementations, a value associated with that feature may be included in the feature vector at that position and/or bucket. In some instances, the positions and/or buckets to which each feature can potentially hash may be determined based on the length and/or size of that feature. For example, strings having a length within a first range can potentially hash to a first set of positions and/or buckets while strings having a length within a second range can potentially hash to a second set of positions and/or buckets. The resulting feature vector may be indicative of the features of the structured file.

For example, the feature extractor 112 may receive a PE file and identify features within that file (e.g., strings, elements, subtrees, tags, function calls, etc.). The feature extractor 112 may then provide each feature as an input to a hash function to generate a hash value for that feature. The feature extractor 112 may use the hash values to form a feature vector representative of and/or indicative of the features in the file. Similar to a PE file, the feature extractor 112 may receive a HTML file, an XML file, or a document file, and identify features (e.g., strings, elements, subtrees, tags, function calls, etc.) within that file. The feature vector may be provided as an input to the machine learning model 114.

In various implementations, any suitable processes, characteristics and/or values can be used to define the feature vector and/or set of values associated with the file. For example, in some implementations, the feature extractor 112 may hash or map n-grams or n-gram representations to the same feature vector. In some implementations, the feature extractor 112 may hash or map n-grams of representations to a portion and/or buckets within a feature vector. In some implementations, the feature extractor 112 may be configured to hash one or more n-gram representations to portions of the feature vector.

In some implementations, the feature vector may be formed from extracted features based on a lookup table, a data map, an associative array, and/or any other data structure and/or function. Such a function can be used instead of or in addition to a hash function. For another example, any other data extracted and/or calculated from the file such as string length values associated with strings within the file, a variance of string length values associated with strings within the file, informational entropy values associated with the file (e.g., calculated based on a frequency of byte values, sequences and/or patterns within one or more byte windows of the file), byte values within the file, values computed based on byte values within the file (e.g., byte value ranges within the file, a standard deviation associated with byte values in the file, etc.) a length of the file, an author of the file, a publisher of the file, a compilation date of the file, data pertaining to whether a valid signature is included with the file, other information that can be parsed from a Portable Executable (PE) file (including but not limited to the size of the header and/or the size of components of the file, such as image sizes and/or the size of the code, versions of operating systems configured to run and/or open the file, section names, entry points, symbol table information, and/or similar information), images and/or representation of images associated with the file, and/or the like, can be used to define the feature vector and/or set of values associated with the file. Additional detail regarding such data extracted and/or calculated from the file can be found in U.S. patent application Ser. No. 15/228,728 filed Aug. 4, 2016 and titled "Methods and Apparatus for Machine Learning Based Malware Detection, now U.S. Pat. No. 9,690,938, and U.S. patent application Ser. No. 15/343,844 filed Nov. 4, 2016 and titled "Methods and Apparatus for Detecting Malware Samples with Similar Image Sets," now U.S. Pat. No. 9,672,358, each of which is incorporated herein by reference in its entirety.

The machine learning model 114 may be any suitable type of machine learning model such as, for example, a neural network, a decision tree model, a gradient boosted tree model, a random forest model, a deep neural network, or other suitable model. The machine learning model 114 may be configured to receive a feature vector associated with an analysis object, and output an analysis result, such as a score indicating whether the analysis object is, for example, potentially malicious, and a descriptive indictor, such as a family or type of malware. The machine learning model may provide an output indicating a threat classification. The threat classification may indicate an evaluation of the likelihood that the analysis object is a threat. For example, the threat classification may classify an analysis object into different categories such as, for example, benign, potentially malicious, malicious, type of malicious content/activity, class of malicious content/activity, malware family and/or the like.

The memory 120 of the malicious content detection device 100 may be, for example, a random access memory (RAM), a memory buffer, a hard drive, a read-only memory (ROM), an erasable programmable read-only memory (EPROM), and/or the like. The memory 120 can store, for example, one or more software modules and/or code that can include instructions to cause the processor 110 to perform one or more processes, functions, and/or the like (e.g., the feature extractor 112 and the machine learning model 114). In some implementations, the memory 120 may be a portable memory (for example, a flash drive, a portable hard disk, and/or the like) that may be operatively coupled to the processor 110. In other instances, the memory may be remotely operatively coupled with the malicious content detection device. For example, a remote database server may be operatively coupled to the malicious content detection device.

The memory 120 may store machine learning model data 122 and an analysis object, shown as file 124. The machine learning model data 122 may include data generated by the machine learning model 114 during processing of the file 124. The machine learning model data 122 can also include data used by the machine learning model 114 to process and/or analyze an analysis object (for examples, weights associated with the machine learning model, decision points associated with the machine learning model, and/or other information related to the machine learning model).

The analysis object, shown as file 124, may be a PE file. The file 124 may be or may include an executable file, a portable executable file, a document, a spreadsheet, a presentation, a text file, an image file, and/or the like. For example, in some instances, the file may be at least one of a Hypertext Markup Language (HTML) file(s), a JavaScript file(s), an Extensible Markup Language (XML) file, a Hypertext Preprocessor (PHP) file(s), portable executables (PE), Microsoft® office documents (for example, Word®, Excel®, PowerPoint®, and/or the like), uniform resource locator (URL), Android Package Kit (APK) files, Portable Document Format (PDF) files, any other files having defined structure, and/or the like. The file 124 can include a software code, a webpage(s), a data file(s), a model file(s), a source file(s), a script(s), a process(es), a binary executable file(s), a table(s) in a database system, a development deliverable (s), an active content(s), a word-processing document(s), an e-mail message(s), a text message(s), data associated with a device or an entity (e.g., a network-connected compute device and/or computer system, a server, a smartphone, a tablet a laptop, a multimedia device, etc.), and/or the like. In some instances, the file 124 may be analyzed by the processor 110 of the malicious content detection device 100 to identify whether the file is malicious, as described in further detail herein.

In some implementations, the analysis object may be, for example, a network stream, or a behavior stream. A representation of the network stream or behavior stream may be stored in the memory 120. A representation of the network stream or behavior stream may be included in the file 124. The file 124 may include a database or other data representation. The file 124 may include the output of one or more sensors. The file 124 may include data extracted from a data lake of sensor data.

The communication engine 130 may be a hardware device operatively coupled to the processor 110 and memory 120 and/or software stored in the memory 120 executed by the processor 110. The communication engine 130 may be, for example, a network interface card (NIC), a Wi-Fi™ module, a Bluetooth® module and/or any other suitable wired and/or wireless communication device. Furthermore the communication engine can include a switch, a router, a hub, and/or any other network device. The communication engine 130 may be configured to connect the malicious content detection device 100 to a communication network (not shown in FIG. 1). In some instances, the communication engine 130 may be configured to connect to a communication network such as, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof.

In some instances, the communication engine 130 can facilitate receiving and/or transmitting a structured file through a communication network. In some instances, a received file may be processed by the processor 110 and/or stored in the memory 120.

In use, the malicious content detection device 100 may be configured to receive an analysis object, file 124, from a communication network (not shown in FIG. 1) via the communication engine 130 and/or via any other suitable method (e.g., via a removable memory device). The feature extractor 112, included in the processor 110, may be configured to receive the file 124 from the communication engine 130 and extract a set of features from the file 124 to define a feature vector. This feature vector and/or the set of features may be stored in the memory 120. The machine learning model 114 may retrieve the stored set of features from the memory 120 and analyze the feature vector. Based on the analysis, the machine learning model 114 may determine whether the structured file 124 is malicious (e.g., if a PE file is malware, if an HTML file includes malicious content, and/or the like) by outputting a malicious content classification. The processor 110 can store the malicious content classification of the structured file 124 in the memory 120. The machine learning model 114 may also provide an indication of an attribute indicator to provide more information about the potential threat.

Figure 2:
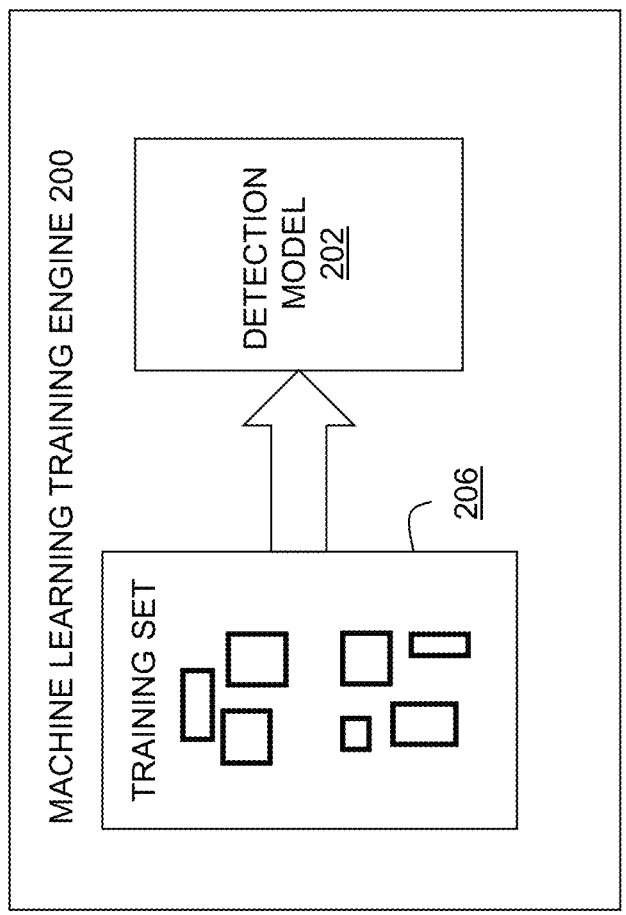
FIG. 2 illustrates a machine learning training engine according to embodiments.

Referring to FIG. 2, a machine learning training engine 200 may include training data 206. Training data 206 may include data used to train a detection model 202. In some instances, training data 206 can include multiple sets of data. Each set of data may contain at least one set of input information and an associated desired output value or label, and typically includes a large number of sets. The input information may include analysis objects and descriptive information for the analysis objects. In some implementations, the training data may include input files pre-categorized into categories such as, for example, malicious files and benign files. In some implementations, the training data may include input files with associated threat scores. In some implementations, the training data may include descriptive information, such as a family or type of malware. In some implementations, the input information may include feature vectors for files and context information for the files, such as attribute indicators for the files. In some implementations, the input information may include threat scores for files.

The training data 206 may be used to train the detection model 202 to perform security recognition tasks.

Figure 3:
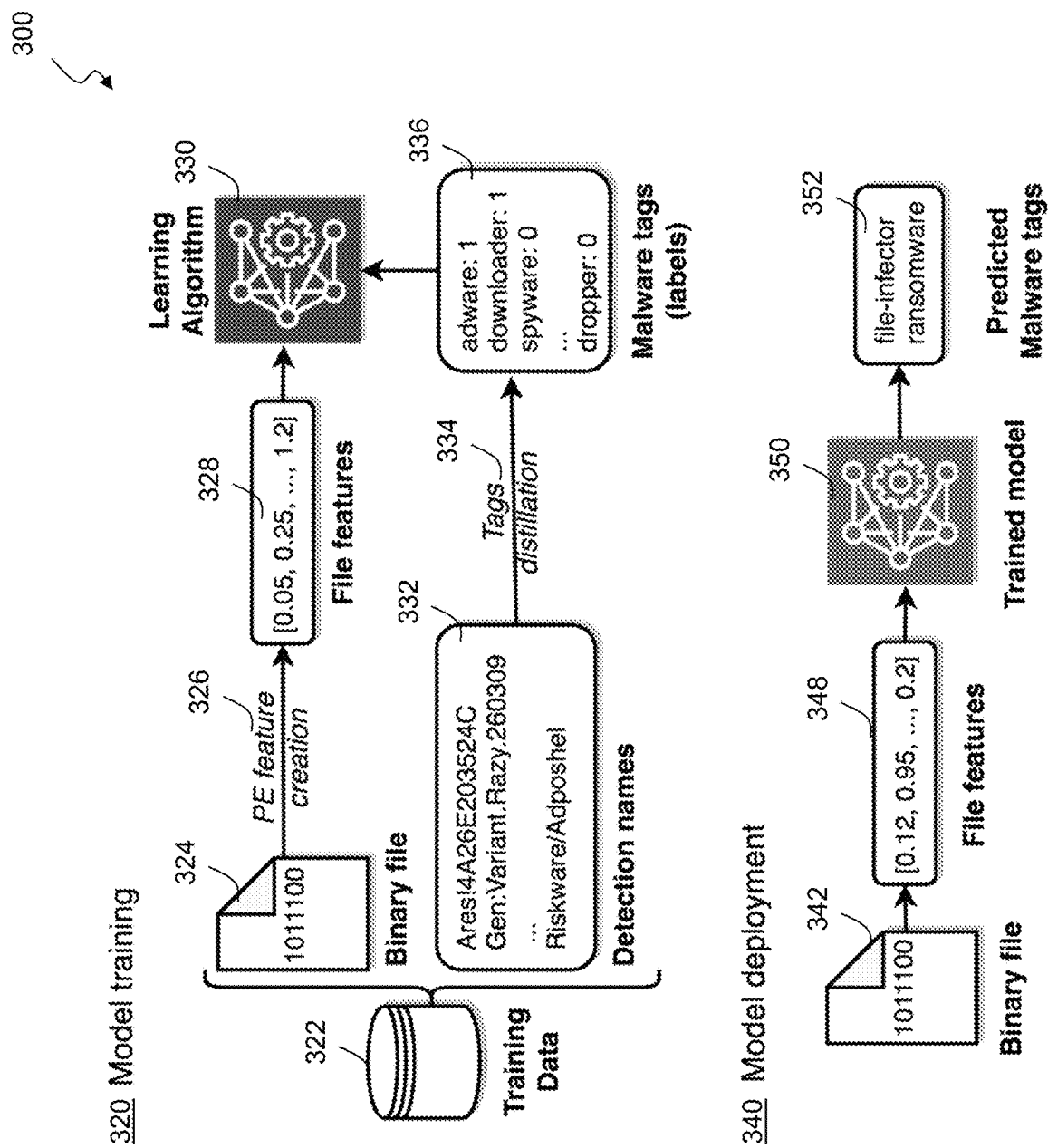
FIG. 3 illustrates model training and model deployment according to embodiments.

Referring to FIG. 3, an exemplary embodiment 300 is shown. In model training 322, a training data database 322 of binary files includes associated detection names. An exemplary binary file 324 is processed 326 by an exemplary feature extractor to generate file features 328. A detection name or names 332 associated with the binary file 324 may be distilled 334 to provide tags (labels) 336. The file features 328 and the tags 336 are provided to a learning algorithm 330 to generate a trained model. It should be understood that there may be a plurality of features extracted, a plurality of distillation processes and a variety or plurality of labels or tags provided to the learning algorithm 330.

In model deployment 340, a target binary file 342 is processed by a feature extractor and file features 348 are generated. The features are processed by the trained model 350, and the trained model is then capable of detecting threats and also providing information about the type of threat that has been detected. This model may address an information gap between conventional machine learning and signature-based detection methods by providing a machine-learning based tagging model that generates human-interpretable semantic descriptions of malicious software (e.g., file-infector, coinminer). These descriptions provide potentially more useful and flexible information than malware family names.

In some implementations, a method for deriving high level descriptions of malware files from an ensemble of family names from different sources is used. By formalizing the problem of malware description as a tagging problem, a joint embedding deep neural network architecture may be used, for example, to learn to characterize portable executable (PE) files based on the results of static analysis, thus not requiring a dynamic trace to identify behaviors at deployment time.

In an exemplary implementation, a tagging model properly identified more than 95% of a set of eleven tag descriptors extracted from an ensemble of detection names for a given sample, at a deployable false positive rate (FPR) of 1% per tag. Furthermore, when evaluating this model on ground truth tags derived from dynamic analysis of the files, it correctly predicted 94% of the labels for a given sample. Thus, a tagging model may be effectively deployed alongside a detection model for malware description.

We define a semantic malware attribute tag (which we will also refer as a malicious or malware tag for short) as a potentially informative, high-level attribute of malicious software. The tag may be referred to as a tag or label. In some implementations, the tags or labels may be loosely related to malware families, in the sense that they attempt to describe how piece of malicious software executes and what is its intention, but they do so in a more general and flexible way. One malware campaign (or family) can be associated with more than one tag, and a given tag may be associated with multiple families.

In an implementation, and without loss of generality, a set T may be defined with |T|=11 different tags of interest that we can use to describe malicious PE files, specifically: adware, crypto-miner, downloader, dropper, fileinfector, flooder, installer, packed, ransomware, spyware, and worm. This set of tags may be selected to be able to generate concise descriptions for common malware currently found in the wild. A description of these exemplary tags follows.

Adware. Potentially unwanted software that shows the user an excessive number of—often in browser—ads, or changes the user's home page to an ad, to get more clicks.

Crypto-miner. A program that uses a machine's computational resources to mine cryptocurrency, without the user's knowledge or consent, sending the results back to a central location.

Downloader. Malicious program whose primary purpose and functionality is to download additional content. Often similar in usage to a Dropper.

Dropper. Malicious program that carries another program concealed inside itself, and drops that program onto an infected machine.

FileInfector. Infects executable files with the intent to cause permanent damage or make them unusable. A file-infecting virus overwrites code or inserts infected code into a executable file.

Flooder. Designed to overload a machine's network connections. Servers are common targets of these attacks.

Installer. Installs other potentially unwanted software.

Packed. Indicates that the malware was packed for the sake of avoiding detection.

Ransomware. Malware whose goal is to encrypt or otherwise make inaccessible a user's files, to then demand payment to regain access to them.

Spyware. Covers programs that collect confidential information and send it to an attacker. This confidential information could range from web browsing habits, keystroke logging, password stealing or banking information, among others.

Worm. Software that automatically spreads itself.

Since these malware tags are defined at a higher level of abstraction than malware families, we can bypass the problem of not having a common naming strategy for malicious software, and may exploit knowledge contained in multiple genealogies generated by different sources in a quasi-independent manner: detection technologies, methodologies, etc. For example, it may be irrelevant if one source identifies a sample as being part of the Qakbot family while another calls it Banking Trojan if we can associate both correctly with the "spyware" tag. (And, if Qakbot, for example, also shows the behavior of a worm, it could also be tagged as it.) Furthermore, some sources for names or labels might have stronger detection rules for certain kinds of malware while others for a different kind.

A variety of labelling strategies may be used. In an exemplary embodiment, one or more of three labeling approaches may be used to generate tags given for a set of files: i) one that combines the information encoded in the detection names of several antimalware sources and then translates them into semantic tags; ii) an extension to the previous labeling strategy that exploits co-occurrence information on these detection names to improve the stability and coverage of the tags; and iii) a dynamic approach based on a behavioral analysis of the files' execution to detect popular malware families with high confidence. As should be understood, these labeled sets may then be used for simultaneous training and evaluation of deep neural networks (DNNs), for example, to annotate previously unseen samples in real time by looking at their binary representation.

Labelling Approach: Tag Distillation from Detection Names

High quality tags for malware samples at the scale required to train deep learning models can be prohibitively expensive to create manually. In some implementations, semi-automatic strategies may be used that are noisier than manual labeling but enable labeling of millions of files that may be used to train a classifier. For training purposes, a labeling function may annotate artifacts (e.g., PE files) using the previously defined set of tags that combines information contained in detection names from multiple sources (e.g., vendors). For example, if a number of information sources (e.g., anti-malware vendors) who publish information about malware are determined to produce sufficiently high quality detection names, these names may be used. The labeling process consists of two main stages: token extraction and token to tag mapping.

Example outputs of each intermediate stage of the tag distillation are represented in Table 1. This procedure may be extended to improve tagging stability and coverage by exploiting statistical properties of detection names.

TABLE 1

EXAMPLES OF DISTILLATION OF TAGS FROM DIFFERENT SOURCES

| Detection name | Tokens | Tags |
| --- | --- | --- |
| Artemis!4A26E203524C, Downloader | artemis, downloader, | adware |
| a variant of Win32/Adware.Adpshel.AM.gen, | variant, win32, adware, | downloader |
| None, None, None, | adpshel, gen, | |
| Gen: Variant.Razy.260309, None, | gen, variant, razy, | |
| Trojan (005153df1), Riskware/Adposhel | trojan, riskware, adposhel | |
| W32.Virlock!inf7, TR/Crypt.ZPACK.Gen, | w32, virlock, inf7, tr, crypt, zpack, gen, | ransomware |
| Trojan (004d48ee1), Virus: Win32/Nabucur.D, | trojan, win32, nabucur, | packed |
| W32/VirRnsm-F, Virus.Win32.PolyRansom.k | win32, vir, rnsm, virrnsm, win32, poly, ransom, polyransom, | file-infector |

TABLE 1-continued

EXAMPLES OF DISTILLATION OF TAGS FROM DIFFERENT SOURCES

| Detection name | Tokens | Tags |
| --- | --- | --- |
| Win32.Virlock.Gen.8, W32/Virlock.J, Trojan-FNET!CCD9055108A1, a variant of Win32/Virlock.J | win32, virlock, gen, trojan, variant, win32, virlock | |

In Table 1, The first column shows detection names from 9 different sources (e.g., vendors), where the value None means that the information source has not reported a detection of the sample. In the second column the tokens extracted from the detection names are listed. The last column shows the tags associated with the tokens in the middle column.

In the first row of Table 1, the tokens "adware" and "adposhel" are associated with the tag "adware." The token "downloader" is associated with the tag "downloader."

In the second row of Table 1, the tokens "virlock," "nabucur," and "rnsm" are associated with the tag "ransomware." The tokens "crypt" and "zpack" are associated with the tag "packed." The token "virmnsm" is associated with the tag "file-infector."

Tokens Extraction. A first step for deriving tags from detection names may include parsing individual detection names to extract relevant tokens within these names. A token is defined as a sequence of characters in the detection name, delimited by punctuation, special characters or case transitions from lowercase to uppercase (e.g., create tokens both splitting and not splitting in case transitions). These then may be normalized to lowercase. For example, from the detection name Win32.PolyRansom.k, the set of tokens {win32, polyransom, poly, ransom, k} may be extracted.

The parsed tokens may be filtered, for example by prevalence. In an implementation, once the tokens from for a given training dataset are generated, the tokens that appear in a fraction of samples larger than a in our dataset are retained. For example, a threshold $\alpha$ may be set to 0.06%, but higher or lower values may be used. In one implementation using 0.06%, a manual inspection of the remaining tokens found that they were mostly non-informative pseudo-random strings of characters usually present in detection names (e.g., '31e49711', '3004dbe01').

Token to Tag Mapping. Once the most common tokens are defined, an association rule may be used to associate tokens to tags for those tokens related with well-known malware family names or those that could be easily associated with one or more of our tags. For example, nabucur is the family name of a type of ransomware and therefore can be associated with that tag. Similarly, the token xmrig, even though it is not the name of a family of malware can be recognized as referring to a crypto-currency mining software and therefore can be associated with the crytpo-miner tag. This may be performed manually, or may be based on other mappings that are available. For example, a mapping from tokens to tags was created based on prior knowledge. This mapping may associate a sample with a tag if any of the tokens that map to that tag are present in any of the detection names given by the set of trusted sources for that file.

Token relationships mining. In order to understand how tokens relate to each other, an empirical token conditional probability matrix K may be calculated:

$$K(i,j)=p^-(k_i|k_j)=\#(k_i \cap k_j)/\#k_j \quad (1)$$

where $\#k_i$ is the number of times the token $k_i$ appears in a given dataset, and $\#(k_i \cap k_j)$ is the number of times $k_i$ and $k_j$ occur together. $K(i, j)$ is then, by definition, the empirical conditional probability of token i given token j for a given dataset of samples. The following pairwise relationships between tokens may be defined based on their empirical conditional probabilities:

Tokens $k_i$ and $k_j$ are synonyms under threshold $\beta$ if and only if $p^-(k_i|k_j) > \beta$ and $p^-(k_j|k_i) > \beta$.

Token $k_i$ is a parent of token $k_j$ under threshold $\beta$ if and only if $p^-(k_i|k_j) > \beta$ and $p^-(k_j|k_i) \leq \beta$.

Token $k_i$ is a child of $k_j$ under threshold $\beta$ if and only if $p^-(k_i|k_j) \leq \beta$ and $p^-(k_j|k_i) > \beta$.

With this in mind, the labeling function described may be extended.

The tag $t_i$, associated with a set of tokens $K_i = \{k_1, \ldots, k_j\}$, may describe a given malware sample x if, after parsing the detection names for x we find that:

(A) Any of the tokens $k \in K_i$ is present for sample x, (B) OR any of the synonyms of k is present for the sample (for every $k \in K_i$), (C) OR any of the children of k is present (for every $k \in K_i$).

(A) above refers to the use of a mapping such as a manually created mapping between tags and tokens, e.g., a labeling function, while (B) and (C) may be automatic steps for extending the tag definitions and improving the stability of the tagging method. Empirically, in an implementation, it was observed that when computing the token co-occurrence statistics in a training set as in Equation 1, the automatic steps improved the tag coverage in the validation set in average by 13%, while increasing the mean token redundancy, or the mean number of tokens observed per tag from 2.9 to 5.8, as shown in Table 2 below. This increase in mean token redundancy makes the labeling function more stable against mis-classifications or missing scans by the set of trusted sources. A more complete analysis of the value of the automatic extraction step may be deferred. The parameter $\beta$ was set to 0.97, value at which the coverage for malicious tags improved for malware samples in our validation set, while remained constant for benign samples.

The tags obtained with this labeling procedure may be noisy because of the different sources used in extracting tokens from multiple sources. Because of this, we may refer to samples annotated with this method as weakly labeled. On the other hand, this labeling methodology has the advantage of being relatively inexpensive to compute and having high coverage over samples. As far as there is one of the sources that names the sample with a detection name, and that detection name contains a token associated with one of the previously defined tags, directly or statistically via a parent-child or synonym token relationship, there will be a label for that sample. It is worth noting that this labeling technique generates primarily positive relations: meaning that a tag being present identifies a relationship between the sample and the tag, but the absence of it does not necessarily imply a strong negative relation.

Labelling Approach: Tag Creation from Behavior Information

To achieve high quality family name classification we utilized a behavioral sandbox within to replicate samples. This system used a set of signatures developed by researchers to provide classifications that are more accurate than typical traditional AV signatures utilized in static file scanning. Higher levels of accuracy are achieved using the sandbox because it is a dynamic environment that runs the samples causing them to unpack, and download additional components required to expose all of the relevant behaviors during execution. Memory dumps, network traffic packet captures, file read and writes operations, as well as many other activities can be captured that would not necessarily be observable in a static scan alone as in its packaged state this data would be encrypted, or possibly not even present as it may be downloaded at the time of execution. There may be, for example, family specific signatures for this scanbox environment that are able to analyze dropped, downloaded, and modified files, as well as memory dumps, network traffic, and many other artifacts in addition to static binary scans to develop dynamic signatures with much more stringent criteria to define family membership.

For example, to receive a Coinminer family classification the sample must:
Create a network connection to a known mining pool with a using a username, walletID, and/or email address/password combination.
Write a file to disk that contains configuration settings to configure a known coin mining library or executable.
Spawn a process that exhibits high CPU utilization without any user interaction.
Contain strings in a memory dump or executable file with strings referencing domain or IP addresses associated with a known mining pool.

One determination to be made is intent, as many people may use coinminers legitimately. Malicious intent may be determined, for example, with a claim that a legitimate cryptocurrency mining application would not automatically apply configuration settings with a specific mining pool account and automatically start utilizing the CPU for mining in the background without any user interaction. Although there may be a few cases of this where a legitimate user may script a cryptomining installation for deployment across a server farm for the purposes of industrial mining, it is unlikely these would be distributed outside of the environment for which it is intended to be deployed. If the scripted installation were leaked and run on a system outside the environment it would become malware at that point.

Another signature might be more simple. Sality, for example, is a parasitic file infector meaning it will embed its malicious code into other clean PE files on the system infecting them as well. It spreads if any of these files are then copied to and run on other systems. Sality uses a system wide mutex to determine if another instance of the infection is already running on the system as the chances are quite high that another executable that has also been infected would be launched on the same system. It also uses specific markers when it infects a new file to indicate that the file has been infected as to not re-infect. A signature to classify this family may be as simple as identifying the presence of the unique mutex or the markers in files that have been opened and modified by the virus.

The process used to reliably generate ground truth tags for a set of samples consists in executing the files in a sandbox environment and identifying family-specific behaviors. For this, we rely on a set of dynamic signatures written to specifically match given malware families. These family signatures are themselves typically composed of multiple behavioral and static signatures that look at artifacts from the dynamic execution of the sample such as specific strings, routines, or structures in memory dumps, dropped files, or network traffic captures, among others.

Because these sandbox signatures are so specific and do not rely on circumstantial evidence for family classification, whenever any of these dynamic family signatures are triggered when executing a given file, we then know with high confidence that the sample belongs to the associated family. With this information, we then keep those samples for which we have positively identified a family, and annotate them with tags that describe their associated malware family well. Since we are only looking at a set of well-defined malicious families, and basing our detection on very specific behaviors, the support of this labeling technique—i.e., the number of samples for which we generate tag labels—is low and biased towards a specific set of malware types. On the other hand, because of the method used, the labels generated are considered to be high quality and can be safely used as ground truth in our analyses. It is also the case that, although this labeling method creates strong positive associations between tags and samples, the absence of a tag for a given sample does not imply that there exists a negative association, thus introducing label noise for the negative class.

The family signatures used in this labeling mechanism are mostly concerned with the actual malware behavior and not necessarily with the delivery mechanism. For instance, if we are dealing with a piece of malware that exhibits the behavior of a dropper, the behavioral analysis will focus mostly on characterizing the dropped payload. Because of this, the tags that describe delivery mechanisms such as installer, packed and dropper are not generated with this method.

Figure 4:
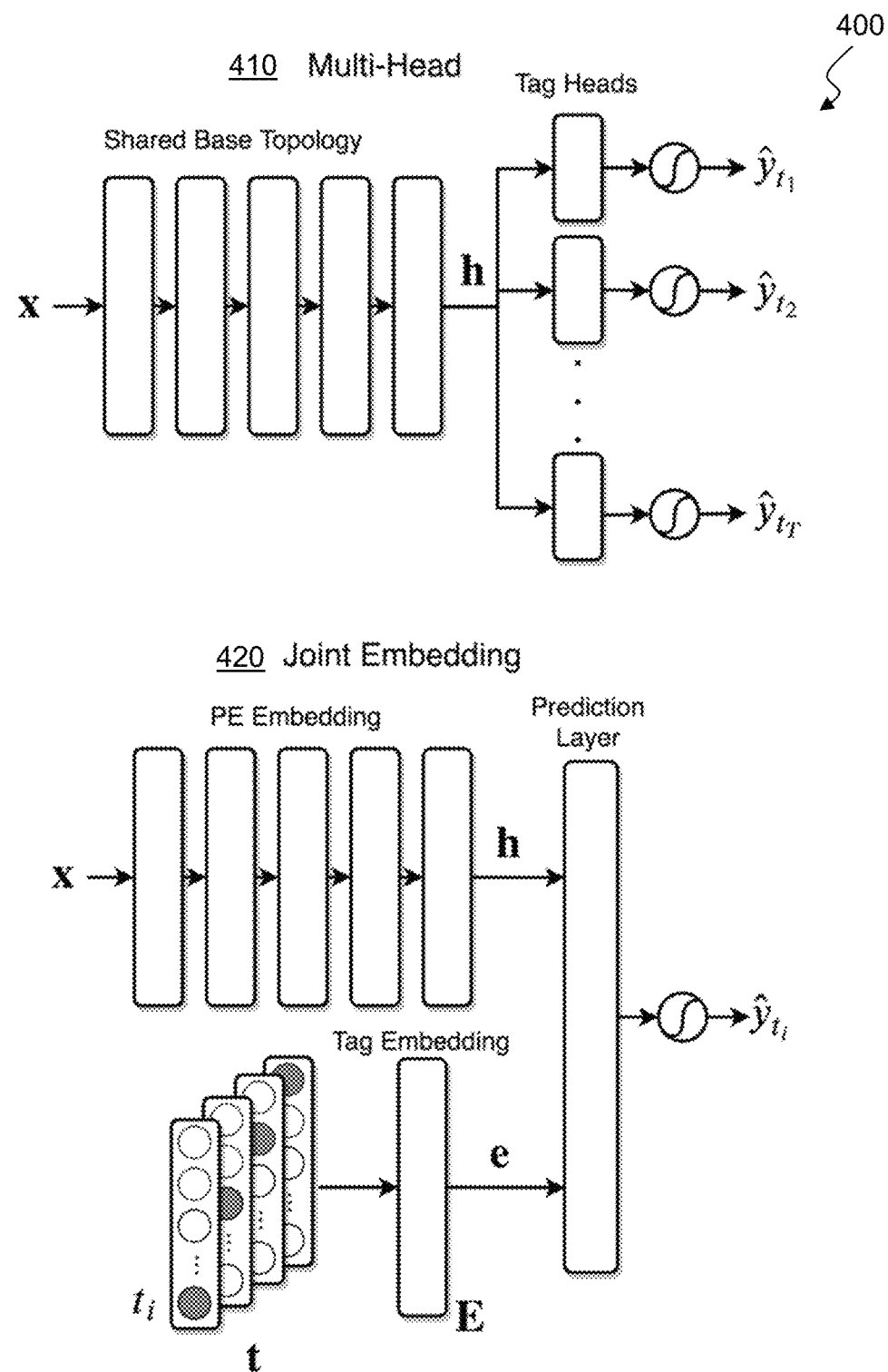
FIG. 4 illustrates a multi-head model and a joint embedding model in various embodiments.

Referring to FIG. 4, two neural network architectures 400 are shown. With a labeling scheme defined, a tag prediction task may be considered as multi-label classification, since zero or more tags from the set of T possible tags T={t1, t2, . . . , tT} can be present at the same time for a given sample. In order to predict these tags, two different neural network architectures are described, referred to as Multi-Head 410 and Joint Embedding 420.

A Multi-Head model 410 for a neural network may be used for malware detection and tagging. The Multi-Head model includes, for example, a base feed-forward network with one "head" for each tag it is trained to predict. Each of the heads may be composed of dense layers followed by ELU nonlinearities, and a sigmoid activation function. The multi-head architecture can be thought as an extension of the network used in (J. Saxe and K. Berlin. 2015. Deep neural network based malware detection using two dimensional binary program features. In 2015 10th International Conference on Malicious and Unwanted Software (MALWARE). 11-20. DOI:http://dx.doi.org/10.1109/MALWARE.2015.7413680) but to multiple outputs. It uses a base topology that is common to the prediction of all tags, and one output (or "head") per tag. Both parts of the architecture consist of multiple blocks composed of dropout, a dense layer, batch normalization, and an exponential linear unit (ELU) activation function. In this implementation, the input layer does not use dropout and the very last layer of each head uses a sigmoid activation unit to compute the predicted probability of each label.

A Joint Embedding model 420 represents both the binary samples x and the tags t onto the same low dimensional space and issues predictions based on the distance of the sample and the tags in this space. The joint embedding model exploits semantic similarities between tags. This model maps both the tags t and the binary file features x to vectors in a joint Euclidean latent space. This embedding of files and tags is performed in a way such that, for a given similarity function, the transformation of semantically similar labels are close to each other, and the embedding of a binary sample should be close to that of its associated labels in the same space. This architecture includes a PE embedding network, a tag embedding matrix E, and a prediction layer.

The PE embedding network learns a nonlinear function $\phi\theta(\cdot)$, with parameters $\theta$ that maps the input binary representation of the PE executable file $x \in R^d$ into a vector $h \in R^D$ in low dimensional Euclidean space, $$\phi_\theta(x): \mathbb{R}^d \to \mathbb{R}^D.$$

The tag embedding matrix $E \in R^{T \times D}$ learns a mapping from a tag $t_n \in T = \{t1, \ldots, tT\}$, to a distributed representation $e \in R^D$ in the joint embedding space, $$\phi_E(t): \{t_1, \ldots, t_T\} \to \mathbb{R}^D.$$

In practice, the embedding vector for the tag $t_n$ is simply the nth row of the embedding matrix, i.e., $\phi E(t_n) = E_n$. Finally, the prediction layer compares both the tag and the sample embeddings and produces a similarity score that is ran through a sigmoid nonlinearity to estimate the probability that sample x is associated with tag t for each $t \in T$. In our model, the similarity score is the dot product between the embedding vectors. The output of the network $fn(x|\theta, E)$ then becomes:

$$\hat{y}_n = f_n(x | \theta, E) \qquad (2)$$
$$= \sigma((\phi_E(n), \phi_\theta(x)))$$
$$= \sigma((E_n h)),$$

where $\sigma$ is the Sigmoid activation function, and $\hat{y}_n$ is the probability estimated by the model of tag $t_n$ being a descriptor for x. We further constrain the embedding vectors for the tags as suggested in (Jason Weston, Samy Bengio, and Nicolas-Usunier. 2010. Large scale image annotation: Learning to rank with joint word-image embeddings. Machine Learning 81, 1 (October 2010), 21-35. DOI:http://dx.doi.org/10.1007/s10994-010-5198-3).

$$\|E_n\|_2 \leq C, n = 1, \ldots, T, \qquad (3)$$

which acts as a regularizer for the model. We observed in practice that this normalization indeed leads to better results in the validation set. Unless stated differently we fixed the value of C to 1.

We also experimented with constraining the norm of the PE embeddings to 1, and analogously using cosine similarity instead of dot product as a similarity score between tags' and files' embeddings. In both cases we observed a deteriorated performance on the validation set. This drop in performance was more noticeable for those samples with multiple tags (more than 4), suggesting that the network is using the magnitude of the PE embedding vector to achieve high similarity scores for multiple tags concurrently. As part of our experimentation we also tried to learn the similarity score by concatenating together the PE and tag embeddings and running the resulting vector through some feed forward layers with non-linearities, only to find that the simpler approach of using cosine similarity was both more effective in the tag prediction task and more interpretable.

Our goal is, for a given PE file, to learn a distributed, low dimensional representation of it, that is "close" to the embedding of the tags that describe it. The parameters of both embedding functions $\phi\theta(\cdot)$ and $\phi E(\cdot)$ are learnt jointly to optimize the binary cross-entropy loss for the prediction of each tag via backpropagation and stochastic gradient descent. The loss function to be minimized, for a mini-batch of M, samples becomes:

$$\mathcal{L} = -\frac{1}{M} \sum_{i=1}^{M} \sum_{n=1}^{T} f_n(x^{(i)} | \theta, E) \log(t_n^{(i)}) + \qquad (4)$$
$$(1 - f_n(x^{(i)} | \theta, E)) \log(1 - t_n^{(i)})$$
$$= -\frac{1}{M} \sum_{i=1}^{M} \sum_{n=1}^{T} \hat{y}_n^{(i)} \log(t_n^{(i)}) + (1 - \hat{y}_n^{(i)}) \log(1 - t_n^{(i)})$$

where $t_n^{(i)}$ is one if sample i is labeled with tag $t_n$, and $y_n^{(i)}$ is the predicted probability by the network of that tag being associated with the i-th sample.

In practice, to get the tag similarities for a given sample x with PE embedding vector h we multiply the matrix of tag embeddings $E \in R^{T \times D}$ by $h \in R^D$ and scale them to obtain a prediction vector $\hat{y} = \sigma(E \cdot h) \in R^T$, where $\sigma$ is the element-wise sigmoid function for transforming the similarity values into a valid probability value.

Evaluation of Tagging Algorithms

There are different ways to evaluate the performance of tagging algorithms. Particularly, the evaluation can be done in a per-tag or a per-sample dimension. The former seeks to quantify how well a tagging algorithm performs on identifying each tag, while the latter focuses on the quality of the predictions for each sample instead.

In the per-tag case, one suitable way to evaluate the performance of the model is to measure the area under the receiver operating characteristic curve (AUC-ROC, or simply AUC) for each of the tags being predicted. A ROC curve is created by plotting the true positive rate (TPR) against the false positive rate (FPR). Also, since the target value for the n-th tag of a given sample is a binary True/False value ($tn \in \{0, 1\}$), binary classification evaluation metrics such as 'Accuracy', 'Precision', 'Recall', and 'F-score' also apply. To compute these metrics, the output prediction needs to be binarized. For the binarization of our predictions, we choose a threshold independently for each tag such that the FPR in the validation set is 0.01 and use the resulting 0/1 predictions. The fact that our labeling methodology introduces label noise mostly associated with negative labels, makes recall the most suitable of these last four metrics to evaluate our tagging algorithms, since it ignores incorrect negative labels.

The per-sample evaluation dimension seeks to evaluate the performance of a tagging algorithm for a given sample, across all tags.

Let $T^{(i)}$ be the set of tags associated with sample i and $T^{\wedge(i)}$ the set of tags predicted for the same sample after binarizing the predictions. We can use the Jaccard similarity (or index)

$$J(T^{(i)}, T^{\wedge(i)})$$

as a figure of how similar both sets are. Furthermore, let $y \in \{0, 1\}^T$ be the binary target vector for a PE file, where $y_n$ indicates whether the n-th tag applies to the file and $\hat{y}$ be the binarized prediction vector from a given tagging model, we define the per-sample accuracy as the percentage of samples for which the target vector is equal to the prediction vector, this is all the tags are correctly predicted, or, in other words, the Hamming distance between the two vectors is zero. For an evaluation dataset with M samples we can use:

$$\text{Mean Jaccard similarity} = \frac{1}{M}\sum_{i=1}^{M} J(T^{(i)}, \hat{T}^{(i)}) \quad (5)$$

$$= \frac{1}{M}\sum_{i=1}^{M} \frac{T^{(i)} \cap \hat{T}^{(i)}}{T^{(i)} \cup \hat{T}^{(i)}}$$

$$\text{Mean per-sample accuracy} = \frac{1}{M}\sum_{i=1}^{M} I(y^{(i)} = \hat{y}^{(i)}) \quad (6)$$

$$= \frac{1}{M}\sum_{i=1}^{M} I(H(y^{(i)}, y^{(i)}) = 0),$$

as our per-sample performance metrics for the tagging problem, where I is the indicator function which is 1 if the condition in the argument is true, and zero otherwise, and H is the Hamming distance between two vectors.

We trained and evaluated exemplary models with these architectures in the task of malware tagging from static analysis of binary files. The experimental details of this process are provided along with the description and analysis of the data used for training and validation along and a definition of the model topology and training methodology.

Data Description

For these implementations, we collected from a threat intelligence feed, three datasets of Windows Portable Executable (PE) files, along with their multi-source associated detection names, and first seen time-stamp.

The first collected dataset is our training set, Dtrain, and contains 7,330,971 unique binary files. All the data in Dtrain was obtained by random sampling of files first observed in our intelligence feed between the period between Jun. 20, 2017 and Mar. 2, 2018.

Secondly, we collected our test set, Dtest, which is composed of 1,608,265 unique entries. The samples in the test set were randomly sampled from all the files whose first seen time in the threat intelligence feed was between Mar. 3, 2018 and Jun. 2, 2018. This temporal split between Dtrain and Dtest ensures that there is no leakage of information between our train and test set.

For both Dtrain and Dtest we derived the semantic tags following the procedure described in Section 3.1, using detection names from 10 anti-malware solutions that we determined to provide sufficiently high-quality names. The set of tokens and mappings used was based only on detection names from samples in Dtrain, in order to avoid polluting our time split evaluation. We set α=0.06% for deciding which tokens unique tokens to keep, resulting in 1,500 unique tokens.

In addition to the two datasets above, we collected a third for further ground truth evaluation, DGT containing 7,033 samples from the same time period as Dtest. For DGT we first got a random sample of files from the time period of interest, but used behavioral traces of the files' execution to determine their ground truth tags. We only kept in the ground truth dataset those samples that were positively identified by our behavioral tagging approach, thus minimizing the amount of label noise.

For all the binary files in the three datasets we then extracted 1024-element feature vectors using the same feature representation described in Saxe and Berlin.

Table 2 summarizes the tag coverage for the weakly labeled dataset Dtest for benign and malicious files.

TABLE 2

Tag Coverage and Mean Token Redundancy

| Tag | Benign Samples | Malware samples | Mean token redundancy |
|---|---|---|---|
| adware | <0.01% | 26.5 (22.5)% | 5.7 (2.9) |
| crypto-miner | 0% | 11.9 (11.2)% | 8.8 (4.8) |
| downloader | <0.01% | 32.4 (26.0)% | 6.7 (2.8) |
| dropper | 0% | 31.9 (27.6)% | 4.5 (1.8) |
| file-infector | <0.01% | 32.6 (31.0)% | 5.7 (3.1) |
| flooder | 0% | 1.3 (1.3)% | 5.1 (1.9) |
| installer | 2.2% | 11.5 (7.3)% | 3.7 (3.3) |
| packed | 3.3% | 33.4 (32.5)% | 4.2 (2.0) |
| ransomware | 0% | 6.6 (6.5)% | 5.6 (2.7) |
| spyware | <0.01% | 48.1 (47.6)% | 6.6 (3.3) |
| worm | 0% | 31.2 (26.7)% | 7 5 (3.4) |
| ANY | 5.2 (5.2)% | 96.0 (954.)% | 5.8 (2.9) |

The rightmost column of Table 2 indicates the mean number of tokens associated with the tag each time the tag appears across all samples. The last row considers a sample as labeled if any of the tags is present, the mean token redundancy for this row corresponds to the mean of the token redundancies for all the tags. Values in parenthesis show the result of the tagging procedure before exploiting statistical relations between tokens mined from the training set.

Most of the tags were exclusively associated with malicious samples, except for installer and packed which were associated with both benign and malicious files. Moreover, we observed that 96% of the malicious samples had tags describing them, indicating that the labeling approach has effectively a high coverage over the set of samples of interest. We also noted that the mean number of tokens observed for each time that a tag appears is 5.57, which represented the degree of robustness of the labeling strategy against label source mis-classifications or missing scans. Synonym and parent-child relationships used to produce the tags were computed from the samples in the train dataset. Using both synonym and parent-child relationships derived from the empirical conditional probabilities of tokens improved not only the mean token redundancy but also the tag coverage for malicious samples noticeably, leaving unaffected the tags for benign samples.

We further analyzed the distribution and pairwise relationships of the tags in our training dataset to identify possible issues with the tagging mechanism as well as understanding the distribution of the tags. The distribution can be compared with the predictions of the model to reach an understanding of possible errors that the model is making.

We trained the models on the training dataset Dtrain for 200 epochs using Adam optimization procedure (for example, as described in Diederik P. Kingma and Jimmy Ba. 2014. Adam: A Method for Stochastic Optimization. arXiv e-prints (December 2014), arXiv:1412.6980) on mini-batches of 4096 samples and a learning rate of $5 \cdot 10^{-4}$ using PyTorch as our deep learning framework.

The shared base topology of the multi-head architecture includes an input feed-forward layer of output size 2048, followed by a batch normalization layer, an ELU nonlinearity and four blocks, each composed by dropout, a linear layer, batch normalization and ELU of output sizes 1024, 512, 256 and 128 correspondingly. Each output head is composed of the same type of basic blocks as the main base architecture of output sizes 64, 32 and 1. The last layer uses a sigmoid non-linearity instead of the exponential linear unit. Binary cross-entropy loss is computed at the output of each head and then added together to form the final loss.

The joint embedding architecture used the same base topology as the multi-head model but with two extra blocks of output sizes 64 and 32 for the embedding of the PE files into the joint latent space of size 32. We used dot product to compute the similarity between the PE file embedding and the tag embedding followed by a sigmoid non-linearity to produce an output probability score. As before, the sum of the per-tag binary cross-entropy losses is used as the mini-batch loss during model training.

We considered primarily two main dimensions of interest when analyzing the performance of a malware tagging algorithm: a per-tag dimension, which evaluates how well each tag is predicted and a per-sample dimension, which focuses on how many samples are correctly predicted and how accurate those predictions are. In the following we analyze the performance of our models across both these dimensions.

Figure 5:
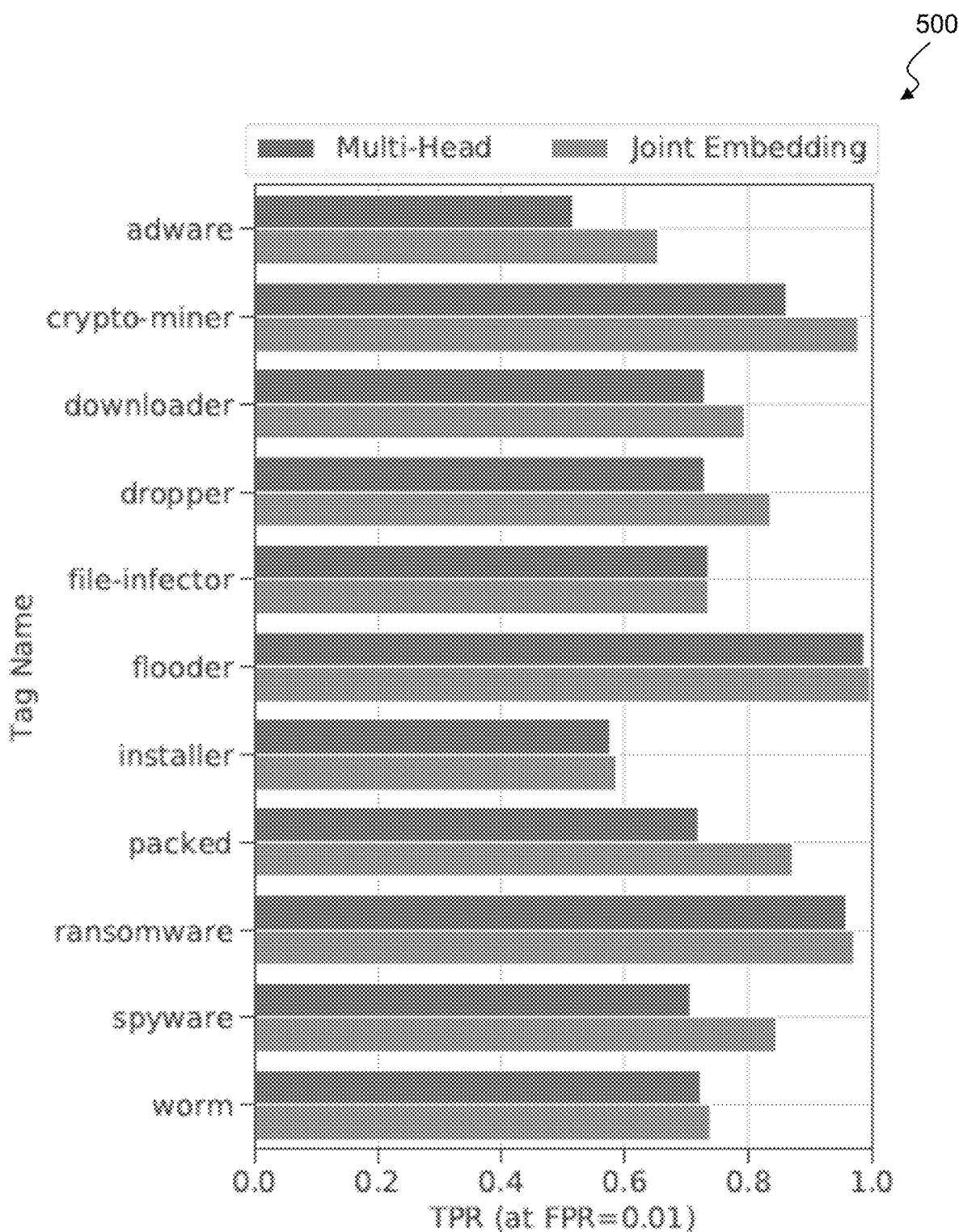
FIG. 5 is a chart that illustrates performance evaluation data for a multi-head model and a joint embedding model according to embodiments.

Referring to FIG. 5, after training the two proposed architectures we proceed to evaluate their performance on the test set Dtest. FIG. 5 shows a graph 500 that compares the per-tag true positive rate (TPR or recall) performance of both the multi-head and joint embedding architectures at a per-tag false positive rate of 1%. In the evaluation for every tag the joint embedding architecture outperforms the baseline multi-head model, in some cases, e.g., for spyware, adware and packed, by an important margin (0.13, 0.14 and 0.15 respectively). We also observed this trend in other implementations with different datasets, layer sizes, and activation functions.

FIG. 6 shows a more detailed comparison between the two approaches. Not only does the joint embedding model outperform the baseline in terms of recall, but it also does so in terms of AUC, except for the installer tag, for which the multi-head model performs better by a small margin. For computing both recall and F-score we binarized the output using a threshold such that the false positive rate (FPR) in the validation set is 0.01 for each tag. For these two binary classification metrics, the joint embedding model achieves better performance than the multi-head model for every tag. On average the multi-head architecture achieves a recall of 0.75 and an F-score of 0.8 while the proposed joint embedding model achieves a recall of 0.82 and an F-score of 0.84.

Lastly, in the rightmost column of FIG. 6, the evaluation results of using the joint embedding model trained in the noisy labeled dataset Dtrain to predict the tags on the ground truth dataset DGT. Because of how our labeling strategy for DGT was defined, and the behavioral signatures available at the time of compiling this work, the ground truth dataset did not have samples that could be strongly associated with some of the tags, thus the missing entries in the table. As noted in section 3.2 the ground truth labels are affected by design by negative label noise, therefore we consider recall as the primary metric for evaluation. Even though being trained in a dataset where the tags were extracted in a different manner, we observe that the evaluation recall on the ground truth dataset is, for most of the tags comparable, if not better than the evaluation on the test set Dtest. These results imply that the model is effectively learning to identify high-quality relationships between binary files and semantic tags even when trained on noisy labels.

Another way of analyzing performance results is to measure the percentage of samples for which our models accurately predicted all tags. For example, how many tags on average (out of the 11 possible tags) each model correctly predicts per sample. To evaluate this dimension of model performance we can measure both the Jaccard similarity and the per-sample accuracy of results according to equations 5 and 6, respectively. In these implementations, with both metrics the joint embedding approach outperformed the multi-head approach significantly. For the joint embedding architecture, the average number of samples for which we predict all the tags correctly is 71.2% while if we choose a sample at random, the model correctly predicts the presence (and absence) of each tag for almost 96% of the tags on average. It is important to note that, because of the relatively low number of tags per sample (2.28 in our test set Dtest) the mean Jaccard similarity of a tagging algorithm that never predicts any tag is 79%. Even though this baseline is already high, both our tagging models outperform it by a large margin, which signals that the models are effectively learning to identify relationships between tags and binary feature vectors.

On the ground truth dataset we observe a drop both in the mean per-sample accuracy and Jaccard similarity for the joint embedding model as expected, resulting in 64% of samples for which all their tags are predicted correctly and a 95% of the tags correctly identified per sample. Nevertheless, under both metrics it still outperforms the multi-head model when this last one is evaluated in the original test set. This second dimension of model evaluation indicates that the relationships learned on the noisy training dataset are applicable to a more properly labeled set of samples.

The comparison results suggest that both architectures may be suitable however Joint Embedding may perform better for malware tagging than the Multi-Head model architecture. Because the PE embedding part of the Joint Embedding architecture is composed of a similar number and size of layers as the shared base architecture of the Multi-Head model, the number of parameters of both neural networks is comparable.

Thus, we hypothesize that the performance improvement is due to a more informative internal representation learned by the Joint Embedding network, which gives it the ability to model, and thus exploit, tag relationships in the latent space. The number of parameters for both networks can be expressed as $O(B+\kappa T)$, where B represents the number of parameters on the shared base and PE embedding topologies, T the number of tags, and x is the number of parameters of each head in the Multi-Head architecture and the latent space dimensionality in the case of the Joint Embedding architecture.

We can verify that the joint embedding has "learned" a proper representation by examining its latent space and validating that PE file embeddings tend to cluster around their corresponding tag embeddings.

Figure 7:
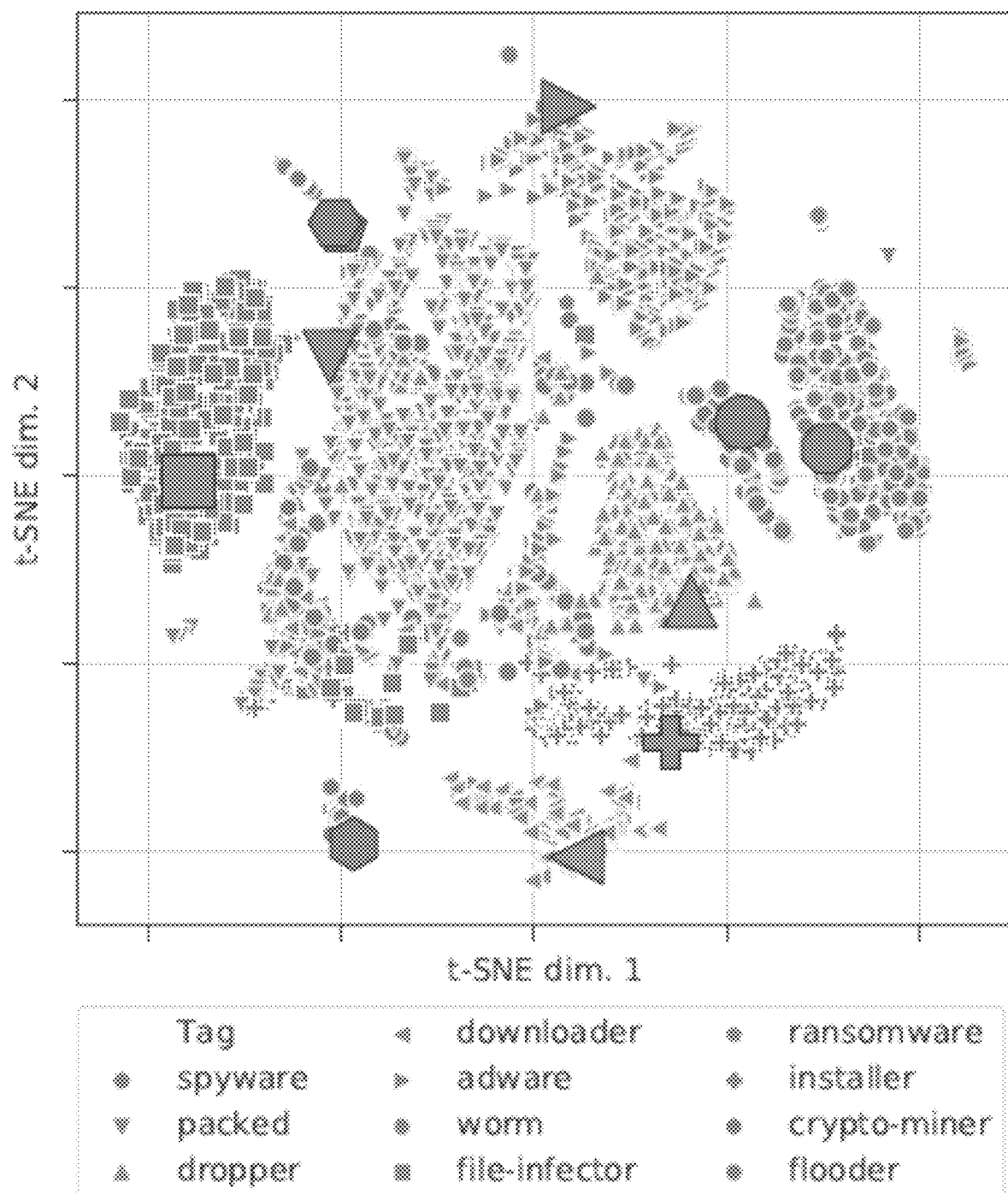
FIG. 7 is a chart that illustrates results using a joint embedding model according to embodiments.

Referring to FIG. 7, to validate and understand the latent space learned by the Joint Embedding model, t-SNE (as described in Laurens van der Maaten and Geoffrey Hinton. Visualizing Data using t-SNE. Journal of Machine Learning Research 9, 2579-2605. http://www.jmlr.org/papers/v9/vandermaaten08a.html) was used to reduce the dimensionality of the 32-dimensional embedded space to a 2-dimensional representation. In this visualization the small markers represent the embeddings of a random sample of PE files that were only labeled with a single tag, while the large markers correspond to the embeddings of the tags themselves.

As one can see, the embeddings of the PE files themselves tend to lie close to their corresponding labels, which suggests that the Joint Embedding has learned to group file representations close to their corresponding tag representations, as intended. Some of the groups appear to exhibit multiple modes, suggesting an intricate distribution in the latent space.

Since the file embeddings do indeed cluster near their corresponding tag embeddings, as intended, there are several other ways in which we could use our Joint Embedding model: tagging can be thought of as a specific case of information retrieval in which we retrieve tags for a given query sample based on a distance function in the latent space. In a similar vein, it would be possible to use one malware sample to retrieve other samples with similar characteristics (described by the same set of tags) in a forensics or analysis context. Finally, given a combination of descriptive tags we could retrieve a set of samples that are closely associated with that combination—e.g., by returning samples near the centroid of the tag embeddings.

In an exemplary implementation, a method for searching for similar artifacts may include training a neural network model using artifacts and tags in a joint embedding architecture (as shown in FIG. 4) thereby generating a latent space. Locations of a set of artifacts in the latent space may be stored, or, for example, indexed. A location of a target artifact in the latent space may be determined. Nearest neighbors of the target artifact in the joint latent space may be identified using the determined location and a distance function. The nearest neighbors may be designated as artifacts that are similar to the target artifact. The nearest neighbors may be designated as a set of artifacts that are similar to the target artifact. Tags associated with the nearest neighbors may be determined. Tags associated with the nearest neighbors may be associated with the target artifact. Thus, tags from the closest similar artifacts (in the latent space) may be associated with a target artifact. This can provide helpful information even in the case where the neural network does not assign a tag.

The locations of two or more target artifacts may be determined. The latent space may be a joint latent space. The joint latent space may be a joint Euclidean latent space. The method may include providing the designated nearest neighbors as search results. The artifacts may be malware samples and the tags may be types of malware.

In an implementation, a method for searching for similar artifacts includes training a neural network model using artifacts and tags in a joint embedding model thereby generating a latent space. The locations of a set of artifacts in the latent space may be stored. The location of one or more target tags in the latent space may be stored. Artifacts that are nearest neighbors of the one or more target tags in the latent space may be determined using a distance function. The nearest neighbors may be identified as closest to the one or more tags. The nearest neighbors may be designated as associated with the one or more target tags.

The one or more tags may be one tag. The one or more target tags may be a weighted set of tags. The latent space may be a joint latent space. The joint latent space may be a Euclidean space. The method may include providing the designated nearest neighbors as search results. The artifacts may be malware samples and the tags may be types of malware.

As described herein, we have formalized the concept of describing malicious software with descriptive attributes as a multi-label prediction task or tagging problem. Our models are able to learn a nonlinear mapping between raw binary files and descriptive tags for malware characterization.

We have described a simple data-driven semi-automatic approach for extracting and combining descriptive information of malware samples from, for example, detection names from multiple sources (e.g., multiple vendors). Furthermore, we evaluated two different approaches to malware description via tagging with deep neural networks, and showed that both models are suitable and the Joint Embedding model performed reasonably accurately predict user interpretable attribute and behavioral descriptions of malicious files from static features, correctly predicting an average of 10.55 out of 11 tag descriptors per sample. Finally we have shown that the noisy tags extracted from detection names are a suitable surrogate label for learning tags created through more expensive behavioral analyses. When evaluating our proposed Joint Embedding model against ground truth tags for samples belonging to well-known malware families, 10.36 out of the 11 descriptors were correctly predicted per sample, in average.

In some implementations, these techniques may be applied to, for example, malware similarity clustering, and alerts prioritization. In some implementations, the set of tags may be expanded to describe malware samples with a more complete taxonomy. In some implementations, ground truth labeled sets may be used to fine-tune a model trained with weak labels.

While the examples provided above describe classification of maliciousness of a file, the disclosed devices and methods may be more generally applied to classification of artifacts including without limitation any type of information technology or network artifact, such as network streams, email traffic analysis, and so forth. The techniques also may be extended to such other data that has classifications available, such as suitable image data, video data, voice data or text based data, numbers and counts based data and/or the like. For example, rather than and/or in addition to producing a maliciousness type, the devices and methods disclosed herein can be used to classify artifacts based on analysis of their content and provide a type of artifact using one or more characteristics that are determined. In other instances, the devices and methods described herein can be used to classify audio content, video content, text content, file type, and/or any other suitable events, objects, artifacts and/or data for any other suitable purpose, in addition to and/or instead of producing a maliciousness classification and a type of malware.

Figure 8:
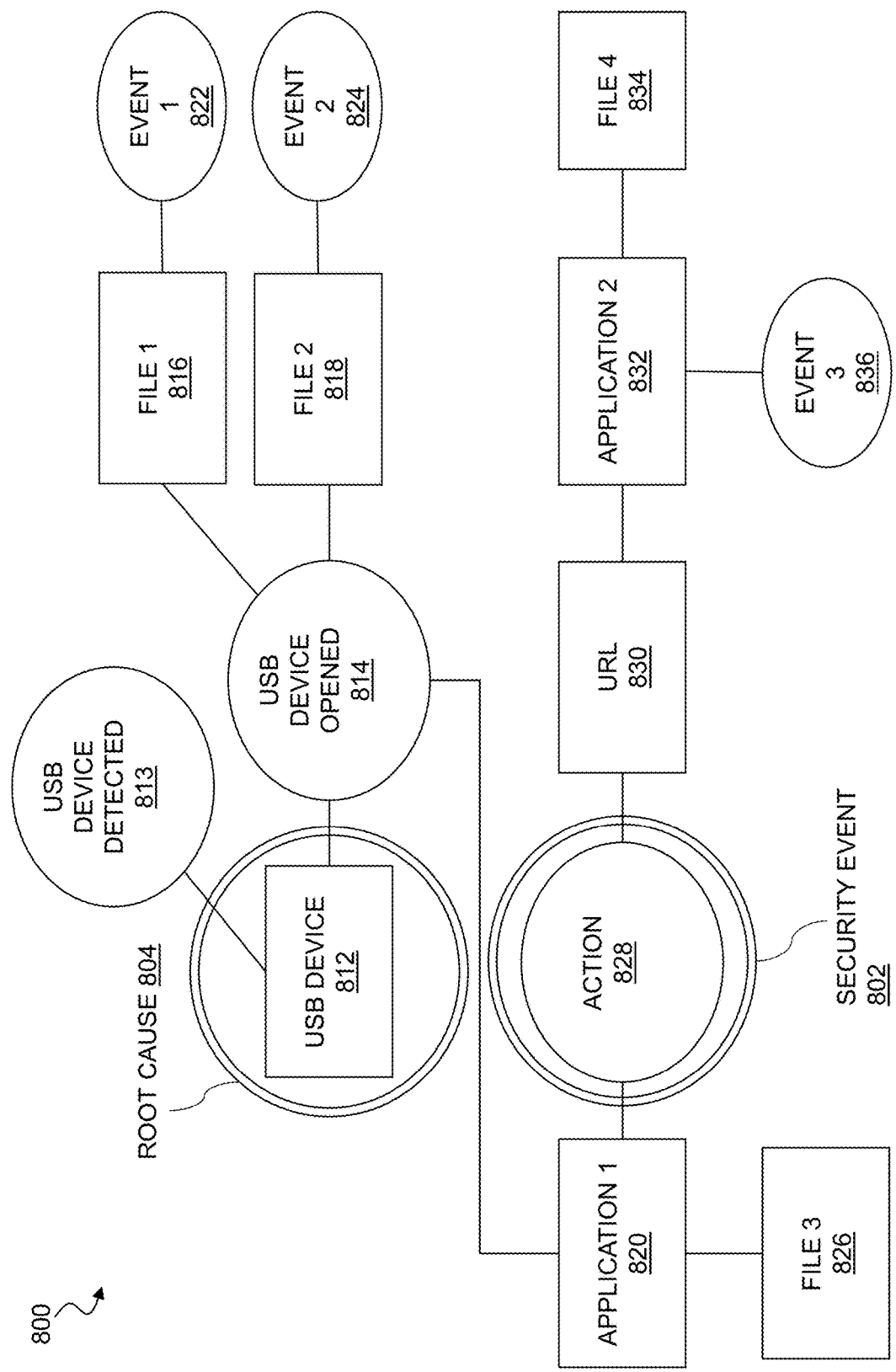
FIG. 8 illustrates a graphical depiction of a portion of an example event graph, according to an embodiment.

Referring to FIG. 8, a graphical depiction of a portion of an example event graph 800 may be used in some embodiments to record the results of a machine learning model (e.g., machine learning model 112 (FIG. 1)) and other information about a target device, for example, an endpoint. The event graph 800 may include a sequence of computing objects causally related by a number of events, and which provide a description of computing activity on one or more endpoints. The event graph 800 may be generated as a compute instance operates, or upon the occurrence of an event, for example, when a security event 802 is detected on an endpoint, and may be based on a data log or similar records obtained by an event data recorder during operation of the endpoint. The event graph 800 may be used to determine a root cause 804 of the security event 802 as generally described above.

The event graph 800 may also or instead be continuously, periodically, and/or sporadically generated to serve as, or be a part of, the data log obtained by the data recorder. In any case, an event graph 800, or a portion of an event graph 800 in a window before or around the time of a security event, may be obtained and analyzed after a security event 802 occurs to determine its root cause 804. The event graph 800 depicted in FIG. 8 is provided by way of example only, and it will be understood that many other forms and contents for event graphs 800 are also or instead possible. It also will be understood that the figure illustrates a graphical depiction of an event graph 800, which may be stored in a database or other suitable data structure. Generation or presentation of the event graph may be directed or configured using information about a type of malware determined, as described herein.

By way of example, the event graph 800 depicted in the figure begins with a computing object that is a USB device 812, which may be connected to an endpoint. Where the USB device 812 includes a directory or file system, the USB device 812 may be mounted or accessed by a file system on an endpoint to read its contents. The USB device 812 may be detected 813 and contents of the USB device 812 may be opened 814, e.g., by a user of the endpoint. The USB device 812 may include one or more files and applications, e.g., a first file 816, a second file 818, and a first application 820. The first file 816 may be associated with a first event 822, for example, by a determination that the first file 816 is potentially or actually malicious and/or based on the type of malware detected. The second file may be associated with a second event 824, for example, that it is potentially or actually malicious and/or based on the type of malware determined.

The first application 820 may access one or more files on the endpoint, e.g., the third file 826 shown in FIG. 8. The first application 820 may also or instead perform one or more actions 828, such as accessing a URL 830. Accessing the URL 830 may download or run a second application 832 on the endpoint, which in turn accesses one or more files (e.g., the fourth file 834 shown in FIG. 8) or is associated with other events (e.g., the third event 836 shown in FIG. 8).

In the example provided by the event graph 800 depicted in FIG. 8, the detected security event 802 may include an action 828 associated with the first application 820, e.g., accessing the URL 830. By way of example, the URL 830 may be a known malicious URL or a URL or network address otherwise associated with malware. The URL 830 may also or instead include a blacklisted network address that although not associated with malware may be prohibited by a security policy of the endpoint or enterprise network in which the endpoint is a participant. The URL 830 may have a determined reputation or an unknown reputation. The URL 830 may involve the downloading of file 834. When file 4 834 is downloaded, the techniques described above may be applied, for example at a network gateway or at an endpoint, and a determination made that file 4 834 is potentially malicious and a type of malware determined as described herein.

In response to detecting the security event 802, the event graph 800 may be traversed in a reverse order from a computing object associated with the security event 802 based on the sequence of events included in the event graph 800. For example, traversing backward from the action 828 leads to at least the first application 820 and the USB device 812. As part of a root cause analysis, one or more cause identification rules may be applied to one or more of the preceding computing objects having a causal relationship with the detected security event 802, or to each computing object having a causal relationship to another computing object in the sequence of events preceding the detected security event 802. For example, other computing objects and events may be tangentially associated with causally related computing objects when traversing the event graph 800 in a reverse order-such as the first file 816, the second file 818, the third file 825, the first event 822, and the second event 824 depicted in FIG. 8. In an aspect, the one or more cause identification rules are applied to computing objects preceding the detected security event 802 until a cause of the security event 802 is identified.

In the example shown in FIG. 8, the USB device 812 may be identified as the root cause 804 of the security event 802. In other words, the USB device 812 was the source of the application (the first application 820) that initiated the security event 802 (the action 828 of accessing the potentially malicious or otherwise unwanted URL 830). Events that are relevant, for example, events that are displayed to a user or to an administrator may be based at least in part on the type of malware that is determined as described herein.

The event graph 800 may be traversed going forward from one or more of the root cause 804 or the security event 802 to identify one or more other computing objects affected by the root cause 804 or the security event 802. For example, the first file 816 and the second file 818 potentially may be corrupted because the USB device 812 included malicious content. Similarly, any related actions performed after the security event 802 such as any actions performed by the second application 832 may be corrupted. Further testing or remediation techniques may be applied to any of the computing objects affected by the root cause 804 or the security event 802.

The event graph 800 may include one or more computing objects or events that are not located on a path between the security event 802 and the root cause 804. These computing objects or events may be filtered or 'pruned' from the event graph 800 when performing a root cause analysis or an analysis to identify other computing objects affected by the root cause 804 or the security event 802. For example, computing objects or events that may be pruned from the event graph 800 may include the USB drive and the USB device being detected 813. Events that may be pruned may be determined by the type of malware, which may be determined as described herein. For example, for malware that is classified as a downloader, events involving URLs may be especially relevant For example, for malware that is classified as ransomware, events interacting with files on the USB device may be relevant. Likewise, if similar malware is designated as a downloader, rules may be applied.

It will be appreciated that the event graph 800 depicted in FIG. 8 is an abstracted, simplified version of actual nodes and events on an endpoint for demonstration. Numerous other nodes and edges can be present in a working computing environment. For example, when a USB device is coupled to an endpoint, the new hardware can first be detected, and then the endpoint may search for suitable drivers and, where appropriate, present a user inquiry of how the new hardware should be handled. A user may then apply a file system to view contents of the USB device and select a file to open or execute as desired, or an autorun.exe or similar file may be present on the USB device that begins to execute automatically when the USB device is inserted. These operations may require multiple operating system calls, file system accesses, hardware abstraction layer interaction, and so forth, which may be discretely represented within the event graph 800, or abstracted up to a single event or object as appropriate. Thus, it will be appreciated that the event graph 800 depicted in the drawing is intended to serve as an illustrative example only, and not to express or imply a particular level of abstraction that is necessary or useful for root cause identification as contemplated herein.

The event graph 800 may be created or analyzed using rules that define one or more relationships between events and computing objects. For example, the C Language Integrated Production System (CLIPS) is a public domain software tool intended for building expert systems, and may be suitably adapted for analysis of a graph such as the event graph 800 to identify patterns and otherwise apply rules for analysis thereof. While other tools and programming environments may also or instead be employed, CLIPS can support a forward and reverse chaining inference engine suitable for a large amount of input data with a relatively small set of inference rules. Using CLIPS, a feed of new data can trigger a new inference, which may be suitable for dynamic solutions to root cause investigations.

An event graph such as the event graph 800 shown in FIG. 8 may include any number of nodes and edges, where computing objects are represented by nodes and events are represented by edges that mark the causal or otherwise directional relationships between computing objects such as data flows, control flows, network flows and so forth. While processes or files can be represented as nodes in such a graph, any other computing object such as an IP address, a registry key, a domain name, a uniform resource locator, a command line input or other object may also or instead be designated to be represented as a node in an event graph as contemplated herein. Similarly, while an edge may represent an IP connection, a file read, a file write, a process invocation (parent, child, etc.), a process path, a thread injection, a registry write, a domain name service query, a uniform resource locator access and so forth other edges may be designated and/or represent other events. As described above, when a security event is detected, the source of the security event may serve as a starting point within the event graph 800, which may then be traversed backward to identify a root cause using any number of suitable cause identification rules. The event graph 800 may then usefully be traversed forward from that root cause to identify other computing objects that are potentially tainted by the root cause so that a more complete remediation can be performed.

Figure 9:
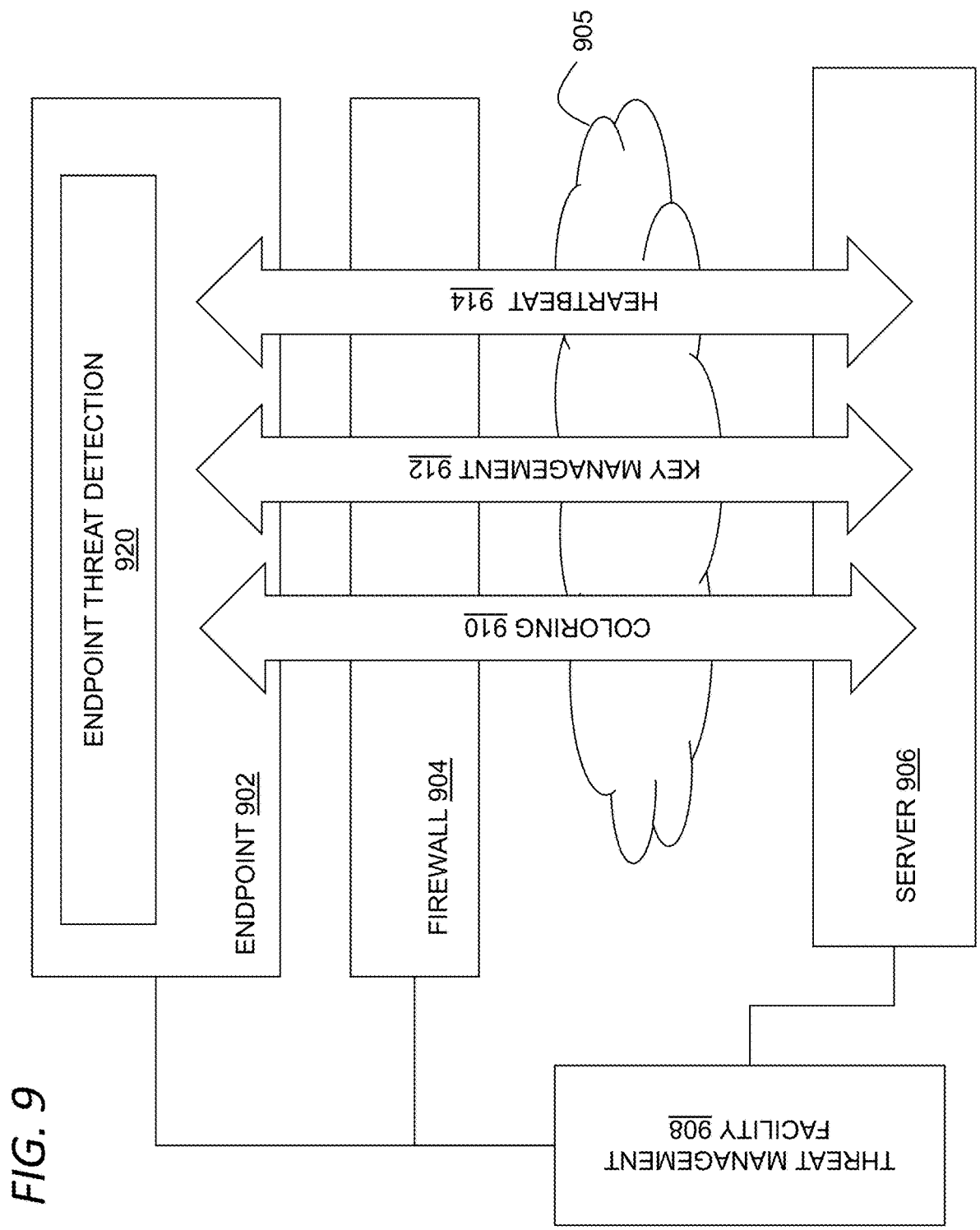
FIG. 9 illustrates a threat management system, according to an embodiment.

FIG. 9 illustrates a threat management system according to some implementations. In general, the system 900 may include an endpoint 902, a firewall 904, a server 906 and a threat management facility 908, coupled to one another directly or indirectly through a data network 905, as generally described above. Each of the entities depicted in FIG. 9 may, for example, be implemented on one or more computing devices, network devices, mobile devices, etc. A number of systems may be distributed across these various components to support threat detection, such as a coloring system 910, a key management system 912 and a heartbeat system 914 (or otherwise an endpoint health system), each of which may include software components executing on any of the foregoing system components (e.g., processors similar to processor 110 shown and described with respect to FIG. 1), and each of which may communicate with the threat management facility 908 and an endpoint threat detection agent 920 executing on the endpoint 902 (e.g., executing on a processor of the endpoint 902) to support improved threat detection and remediation.

The coloring system 910 may be used to label or 'color' software objects for improved tracking and detection of potentially harmful activity. The coloring system 910 may, for example, label files, executables, processes, network communications, data sources and so forth with any suitable label. A variety of techniques may be used to select static and/or dynamic labels for any of these various software objects, and to manage the mechanics of applying and propagating coloring information as appropriate. For example, a process may inherit a color from an application that launches the process. Similarly a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 910 as contemplated herein. The assignment of colors may be an event that is recorded in the event graph 800 (FIG. 8). The assignment of colors may be, or may be based on a determination of a type of malware, as described herein.

The key management system 912 may support management of keys for the endpoint 902 in order to selectively permit or prevent access to content on the endpoint 902 on a file-specific basis, a process-specific basis, an application-specific basis, a user-specific basis, or any other suitable basis in order to prevent data leakage, and in order to support more fine-grained and immediate control over access to content on the endpoint 902 when a security compromise is detected. Thus, for example, if a particular process executing on the endpoint is compromised, or potentially compromised or otherwise under suspicion, access by that process may be blocked (e.g., with access to keys revoked) in order to prevent, e.g., data leakage or other malicious activity. Depending on the policies in place, the key management system 912 may be triggered, for example, by output from machine learning model (e.g., machine learning model 112 of FIG. 1, by a combination of the output of the machine learning model with other information, by the coloring system, by a detection based on the event graph 800 and/or by any other suitable trigger. A policy may be based on a determination of a type of malware as described herein. For example, there may be first policy based on a determination that an artifact is a first malware type (e.g., adware), and a second policy based on a determination that an artifact is a second malware type (e.g., ransomware).

The heartbeat system 914 may be used to provide periodic or aperiodic information from the endpoint 902 or other system components about system health, security, status, and/or so forth. The heartbeat system 914 or otherwise an endpoint health system may thus in general include a health status report system for the endpoint 902, such as through the use of a heartbeat system or the like. A heartbeat may be encrypted or plaintext, or some combination of these, and may be communicated unidirectionally (e.g., from the endpoint 902 to the threat management facility 908) or bidirectionally (e.g., between the endpoint 902 and the server 906, or any other pair of system components) on any useful schedule. The heartbeat system 914 may be used to communicate an identification of malicious or potentially malicious artifacts and types of malware using the techniques described herein to or from an endpoint and/or a firewall and/or a server and/or a threat management facility. A threat management facility 908 may have a first policy that is based on a determination that an artifact is a first malware type (e.g., adware), and a second policy that is based on a determination that an artifact is a second malware type (e.g., ransomware). A determination that a given artifact is a particular malware type may be used to select policies or to take actions as appropriate (e.g., as has been configured) based on rules for that type of artifact.

In general, these various monitoring and management systems may cooperate to provide improved threat detection and response. For example, the coloring system 910 may be used when a particular artifact is identified as malicious or potentially malicious and/or a malware type has been determined, as described, for example, using the machine learning models described herein. The detection may be recorded as an event in an event graph, for example as described with respect to FIG. 8. A color may be assigned to the file, and the assignment of the color to the file included as an event in an event graph as described with respect to FIG. 8. A potential threat may be confirmed based on an interrupted heartbeat from the heartbeat system 914 and/or based on assigned colors or events in the event graph 800. The key management system 912 may then be deployed to revoke access by the process to certain resources (e.g., keys or file) so that no further files can be opened, deleted, or otherwise modified. More generally, the cooperation of these systems enables a wide variety of reactive measures that can improve detection and remediation of potential threats to an endpoint. Generally, having information about the type of malware that has been identified allows for more fine-grained rules and responses, that is, rules and responses may be configured based on the type of malware determined, with the result, for example, that alerts and remedial actions can be taken automatically based on the type of malware determined. Likewise, information can be communicated and recommendations of remedial actions can be made to users or administrators based on the type of malware.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for machine learning recognition of portable executable files as malware, the method comprising:
providing training data comprising features of portable executable files and an attribute indicator for the portable executable files, the attribute indicator comprising a family or type of malware;
training a model using the training data to detect malware;

using the trained model to recognize malware by providing features of a portable executable file as input and providing a threat score and an attribute indicator as output; and taking a remedial action based on the output, wherein the family or type of malware is determined for the training data by:

parsing detection names to extract relevant tokens for each detection name based on sequences of characters within that detection name;

filtering the tokens based on prevalence by removing tokens appearing in a fraction of samples of the training data below a predetermined threshold; and mapping the filtered tokens to tags using one or more association rules.

2. The method of claim 1, wherein the training further comprises training a neural network model using portable executable files and tags in a joint embedding model thereby generating a latent space.

3. The method of claim 1, wherein the trained model is a neural network.

4. The method of claim 1, wherein the remedial action includes at least one of quarantining the file, notifying a user or administrator that the file is malicious, displaying an indication that the file is malicious, displaying an indication of the type of file, or removing the file.

5. The method of claim 1, wherein the attribute indicator includes at least one type of attribute indicator selected from the list of: adware, crypto-miner, downloader, dropper, fileinfector, flooder, installer, packed, ransomware, spyware, and worm.

6. The method of claim 1, wherein the features are determined using a feature extractor.

7. The method of claim 1, wherein the malware type is determined by distilling a detection name to provide labels.

8. The method of claim 7, wherein the distilling comprises determining attributes of a malware file.

9. The method of claim 1, wherein the training data is generated using static detections and behavior analysis.

10. The method of claim 1, wherein the tags include at least one tag for one or more of adware, a downloader, ransomware, a packed file, and a file-infector.

11. A non-transitory processor-readable medium storing code representing instructions to be executed by a processor, the code comprising executable instructions to cause the processor to:

provide training data comprising features of artifacts and an attribute indicator for the artifacts, the attribute indicator comprising a type of artifact;

train a machine learning model using the training data to detect malware; and use the trained machine learning model to recognize malware by providing features of an artifact as input and providing both a threat score and an attribute indicator of the type of artifact as output, wherein the type of artifact is determined for the training data by:

parsing detection names to extract relevant tokens for each detection name based on sequences of characters within that detection name;

filtering the tokens based on prevalence by removing tokens appearing in a fraction of samples of the training data below a predetermined threshold; and mapping the filtered tokens to tags using one or more association rules.

12. The medium of claim 11, wherein the artifact is at least one of a portable executable file, a script, a Hypertext Markup Language (HTML) file, a JavaScript file, or a Hypertext Preprocessor (PHP) file.

13. The medium of claim 11, wherein the machine learning model is a neural network.

14. The medium of claim 11, further comprising taking a remedial action based on the output.

15. The medium of claim 14, wherein the remedial action includes at least one of quarantining the artifact, notifying a user or administrator that the artifact is malicious, displaying an indication that the artifact is malicious, displaying an indication of the type of artifact, or removing the artifact.

16. The medium of claim 11, wherein the features are determined using a feature extractor and the artifact type is determined by distilling a detection name to provide labels.

17. The medium of claim 16, wherein the distilling comprises determining attributes of a detected artifact.

18. The medium of claim 11, wherein the training data is generated using static detections and behavior analysis.

19. The medium of claim 11, wherein the tags include one or more tags for types of malware.

20. The medium of claim 11, wherein the tags include at least one tag for one or more of adware, a downloader, ransomware, a packed file, and a file-infector.

* * * * *